US012732796B2

(12) United States Patent
Manolakos et al.

(10) Patent No.: US 12,732,796 B2
(45) Date of Patent: Sep. 8, 2026

(54) STORING POSITIONING-RELATED CAPABILITIES IN THE NETWORK

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 18/252,437

(22) PCT Filed: Dec. 28, 2021

(86) PCT No.: PCT/US2021/065298

§ 371 (c)(1),
(2) Date: May 10, 2023

(87) PCT Pub. No.: WO2022/150211

PCT Pub. Date: Jul. 14, 2022

(65) Prior Publication Data

US 2024/0015501 A1 Jan. 11, 2024

(30) Foreign Application Priority Data

Jan. 7, 2021 (GR) ............................. 20210100010

(51) Int. Cl.
*H04W 64/00* (2009.01)
*H04W 8/24* (2009.01)

(52) U.S. Cl.
CPC ............. *H04W 8/24* (2013.01); *H04W 64/00* (2013.01)

(58) Field of Classification Search
None
See application file for complete search history.

(56) References Cited

U.S. PATENT DOCUMENTS 11,009,582 B2 5/2021 Hu et al.
11,125,849 B2 9/2021 Shi et al.
(Continued)

FOREIGN PATENT DOCUMENTS

CN 113709787 A 11/2021
CN 114208218 A 3/2022
(Continued)

OTHER PUBLICATIONS

CATT: "Further Discussion on Enhancements for Commercial use Cases", 3GPP Draft, 3GPP TSG-RAN WG2 #112-e, R2-2008810, 3rd Generation Partnership Project (3GPP), Mobile Competence Centre, 650, Route Des Lucioles, F-06921 Sophia-Antipolis Cedex, France, vol. RAN WG2, No. Online, Nov. 2, 2020-Nov. 13, 2020, Oct. 23, 2020 (Oct. 23, 2020), XP051941909, 5 Pages, 2. Discussion 2.3 Enhancement on latency figure 6.1.2-1 3. Conclusion.
(Continued)

*Primary Examiner* — Suhail Khan
(74) *Attorney, Agent, or Firm* — Muncy, Geissler, Olds & Lowe, P.C.

(57) ABSTRACT

Disclosed are techniques for wireless communication. In an aspect, a user equipment (UE) transmits one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second
(Continued)

1100

First Network Entity

Receive one or more positioning capability reports from a user equipment (UE), the one or more positioning capability reports including a set of values for a set of positioning capability parameters, wherein the set of values are non-variable for subsequent positioning sessions involving the UE — 1110

Transmit the set of values to a second network entity via one or more capability transfer messages to enable the second network entity to store the set of values for subsequent positioning sessions involving the UE — 1120 set of values indicate non-variable positioning capabilities of the UE represented by the set of positioning capability parameters.

31 Claims, 13 Drawing Sheets

(56) References Cited

U.S. PATENT DOCUMENTS

| | | | |
|---|---|---|---|
| 11,181,609 | B2 | 11/2021 | Akkarakaran |
| 11,191,054 | B2 | 11/2021 | Opshaug et al. |
| 11,630,181 | B2 | 4/2023 | Edge et al. |
| 2007/0061072 | A1 | 3/2007 | Wuersch et al. |
| 2008/0281520 | A1 | 11/2008 | Ogawa et al. |
| 2009/0227269 | A1 | 9/2009 | Frank et al. |
| 2010/0259444 | A1 | 10/2010 | Kosolobov et al. |
| 2011/0201352 | A1 | 8/2011 | Mallick et al. |
| 2012/0136623 | A1 | 5/2012 | Edge et al. |
| 2013/0079039 | A1 | 3/2013 | Heikkilae et al. |
| 2014/0235264 | A1 | 8/2014 | Venkatraman et al. |
| 2014/0342662 | A1 * | 11/2014 | Das .................... H04W 64/003 455/39 |
| 2016/0095080 | A1 | 3/2016 | Khoryaev et al. |
| 2018/0199160 | A1 | 7/2018 | Edge |
| 2018/0324740 | A1 | 11/2018 | Edge et al. |
| 2018/0343635 | A1 | 11/2018 | Edge et al. |
| 2019/0182665 | A1 | 6/2019 | Edge |
| 2019/0239181 | A1 | 8/2019 | Gangakhedkar et al. |
| 2019/0357011 | A1 | 11/2019 | Edge et al. |
| 2020/0053686 | A1 | 2/2020 | Edge et al. |
| 2020/0084569 | A1 | 3/2020 | Jain et al. |
| 2020/0092737 | A1 | 3/2020 | Siomina et al. |
| 2020/0106632 | A1 | 4/2020 | Lewis et al. |
| 2020/0145977 | A1 | 5/2020 | Kumar et al. |
| 2020/0314595 | A1 | 10/2020 | Hayes et al. |
| 2021/0067990 | A1 | 3/2021 | Opshaug et al. |
| 2021/0109188 | A1 | 4/2021 | Kumar et al. |
| 2021/0149009 | A1 | 5/2021 | Modarres Razavi et al. |
| 2021/0274458 | A1 | 9/2021 | Edge et al. |
| 2021/0360371 | A1 | 11/2021 | Qiao et al. |
| 2022/0174641 | A1 | 6/2022 | Cha et al. |
| 2022/0317231 | A1 | 10/2022 | Edge et al. |
| 2023/0388958 | A1 | 11/2023 | Shreevastav et al. |
| 2023/0408625 | A1 | 12/2023 | Edge |
| 2024/0040370 | A1 | 2/2024 | Manolakos |

FOREIGN PATENT DOCUMENTS

| | | | |
|---|---|---|---|
| CN | 114765773 | A | 7/2022 |
| EP | 2600654 | A1 | 6/2013 |
| EP | 2835993 | A1 | 2/2015 |
| EP | 3833066 | A1 | 6/2021 |
| EP | 4280645 | A1 | 11/2023 |
| JP | 2018533876 | A | 11/2018 |
| TW | 202127928 | A | 7/2021 |
| WO | 2020024972 | A1 | 2/2020 |
| WO | 2020117450 | A1 | 6/2020 |
| WO | 2020147696 | A1 | 7/2020 |
| WO | 2020167615 | A1 | 8/2020 |
| WO | 2020171928 | A1 | 8/2020 |
| WO | WO-2020168242 | | 8/2020 |
| WO | 2021068162 | A1 | 4/2021 |
| WO | 2021217629 | A1 | 11/2021 |
| WO | 2021252377 | A1 | 12/2021 |
| WO | 2022110176 | A1 | 6/2022 |
| WO | 2022141431 | A1 | 7/2022 |
| WO | 2022152087 | A1 | 7/2022 |

OTHER PUBLICATIONS

Huawei, et al., "[Offline-622] [POS] Summary on Uplink Capability for Positioning", 3GPP Draft, 3GPP TSG-RAN WG2 Meeting #109-e, R2-2001947, 3rd Generation Partnership Project (3GPP), Mobile Competence Centre, 650, Route Des Lucioles, F-06921 Sophia-Antipolis Cedex, France, vol. RAN WG2, No. Online, Feb. 24, 2020-Mar. 6, 2020, Mar. 11, 2020 (Mar. 11, 2020), XP051864583, 5 Pages, 2.2 Discussion#3: What UL capability is needed at LMF.

International Search Report and Written Opinion—PCT/US2021/065298—ISA/EPO—Mar. 28, 2022.

Nokia Siemens Networks, et al., "Considerations for Some LPP Stage 2 Outstanding Issues", 3GPP Draft, 3GPP TSG-RAN WG2 Meeting #67bis, R2-095985, 3rd Generation Partnership Project (3GPP), Mobile Competence Centre, 650, Route Des Lucioles, F-06921 Sophia-Antipolis Cedex, France, No. Miyazaki, Oct. 12, 2009, Oct. 12, 2009 (Oct. 12, 2009), XP050390409, 3 Pages, 2.1 Transport of UE positioning capability 2.4 Network support indicator for LPP.

Qualcomm Incorporated: "Discussion of Storing UE Positioning Capabilities in 5GC", SA WG2 Meeting #144e, S2-2102420, 3rd Generation Partnership Project, Mobile Competence Centre, 650, Route Des Lucioles, F-06921 Sophia-Antipolis Cedex, France, vol. SA WG2, No. e-Meeting, Apr. 12, 2021-Apr. 16, 2021, Apr. 6, 2021, XP051993796, 6 Pages, 2. Variation of Positioning Capabilities 3 Solutions for Storage of UE Positioning Capabilities figure 1 figure 2 figure 3 4. Evaluation of Solutions 5. Proposal.

Qualcomm Incorporated: "LPP Impacts for UE Positioning Capability Storage", 3GPP Draft, 3GPP TSG-RAN WG2 Meeting #115-e, R2-2108377, 3rd Generation Partnership Project (3GPP), Mobile Competence Centre, 650, Route Des Lucioles, F-06921 Sophia-Antipolis Cedex, France, vol. RAN WG2, No. Electronic Meeting, Aug. 16, 2021-Aug. 27 2021, Aug. 6, 2021, XP052034778, 6 Pages 1. Introduction 2.1 Variation of UE Positioning Capabilities 3. LPP Impacts for Storage of UE Positioning Capabilities 4 Summary.

European Search Report—EP24199719—Search Authority—Munich—Dec. 13, 2024.

Qualcomm Incorporated: "LPP Impacts for UE Positioning Capability Storage", 3GPP TSG-RAN WG2 Meeting #115-e, R2-2108377, 3rd Generation Partnership Project, Mobile Competence Centre, 650, Route Des Lucioles, F-06921, Sophia-Antipolis Cedex, FRANCE, vol. RAN WG2, No. Electronic Meeting, Aug. 16, 2021-Aug. 27, 2021, Aug. 6, 2021, 6 Pages, XP052034778, 1. Introduction, 2.1 Variation of UE Positioning Capabilities, 3. LPP Impacts for Storage of UE Positioning Capabilities, 4 Summary.

CATT: "UE Positioning Capability Storage", 3GPP TSG-SA WG2 Meeting #145E, S2-2105123, Elbonia, May 17-28, 2021, May 31, 2021, 18 Pages.

Qualcomm Incorporated: "Discussion of Storing UE Positioning Capabilities in 5GC", SA WG2 Meeting #144e, S2-2102420, Apr. 12-16, 2021, e-Meeting, Apr. 6, 2021, 6 Pages.

Qualcomm Incorporated: "LPP Impacts for UE Positioning Capability Storage", 3GPP TSG-RAN WG2 Meeting #115-e, R2-2108377, 3rd Generation Partnership Project, Mobile Competence Centre, 650, Route Des Lucioles, F-06921 Sophia-Antipolis Cedex, France, vol. Ran WG2, No. Electronic Meeting, Aug. 16, 2021-Aug. 27, 2021, Aug. 6, 2021, XP052034778, pp. 1-6.

Taiwan Search Report—TW110149449—TIPO—Jul. 29, 2025.

CATT: "Discussion on UE Positioning Capabilities Storage in Core Network[online]", [text], 3GPP TSG SA2 WG2 #143e, 3GPP, S2-2100674, Mar. 9, 2021, pp. 1-5.

* cited by examiner

Transmit one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters

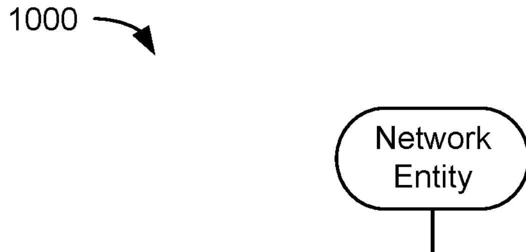

Receive one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters

Transmit one or more positioning capability reports to a location server, the one or more positioning capability reports including a set of values for a set of positioning capability parameters, wherein the set of values are to be stored by a network entity for subsequent positioning sessions, and wherein the set of values is associated with at least one time-tag, at least one expiration timer, or both.

Receive one or more positioning capability reports from a UE, the one or more positioning capability reports including a set of values for a set of positioning capability parameters, wherein the set of values are to be stored by a network entity for subsequent positioning sessions, and wherein the set of values is associated with at least one time-tag, at least one expiration timer, or both.

STORING POSITIONING-RELATED CAPABILITIES IN THE NETWORK

The present application for Patent claims priority to Greek Patent Application No. 20210100010, entitled "STORING POSITIONING-RELATED CAPABILITIES IN THE NETWORK," filed Jan. 7, 2021, and is a national stage application, filed under 35 U.S.C. § 371, of International Application No. PCT/US2021/065298, entitled "STORING POSITIONING-RELATED CAPABILITIES IN THE NETWORK," filed Dec. 28, 2021, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes transmitting one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a method of wireless communication performed by a network entity includes receiving one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a method of wireless communication performed by a first network entity includes receiving one or more positioning capability reports from a user equipment (UE), the one or more positioning capability reports including a set of values for a set of positioning capability parameters, wherein the set of values are non-variable for subsequent positioning sessions involving the UE; and transmitting the set of values to a second network entity via one or more capability transfer messages to enable the second network entity to store the set of values for subsequent positioning sessions involving the UE.

In an aspect, a method of wireless communication performed by a second network entity includes receiving, from a first network entity, via one or more capability transfer messages, a set of values for a set of positioning capability parameters from one or more positioning capability reports of a user equipment (UE), wherein the set of values are non-variable for subsequent positioning sessions involving the UE.

In an aspect, a user equipment (UE) includes a memory; at least one transceiver; and at least one processor communicatively coupled to the memory and the at least one transceiver, the at least one processor configured to: transmit, via the at least one transceiver, one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a network entity includes a memory; at least one transceiver; and at least one processor communicatively coupled to the memory and the at least one transceiver, the at least one processor configured to: receive, via the at least one transceiver, one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a first network entity includes a memory; at least one transceiver; and at least one processor communicatively coupled to the memory and the at least one transceiver, the at least one processor configured to: receive, via the at least one transceiver, one or more positioning capability reports from a user equipment (UE), the one or more positioning capability reports including a set of values for a set of positioning capability parameters, wherein the set of values are non-variable for subsequent positioning sessions involving the UE; and transmit, via the at least one transceiver, the set of values to a second network entity via one or more capability transfer messages to enable the second network entity to store the set of values for subsequent positioning sessions involving the UE.

In an aspect, a second network entity includes a memory; at least one transceiver; and at least one processor communicatively coupled to the memory and the at least one transceiver, the at least one processor configured to: receive, via the at least one transceiver, from a first network entity, via one or more capability transfer messages, a set of values for a set of positioning capability parameters from one or more positioning capability reports of a user equipment (UE), wherein the set of values are non-variable for subsequent positioning sessions involving the UE.

In an aspect, a user equipment (UE) includes means for transmitting one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a network entity includes means for receiving one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a first network entity includes means for receiving one or more positioning capability reports from a user equipment (UE), the one or more positioning capability reports including a set of values for a set of positioning capability parameters, wherein the set of values are non-variable for subsequent positioning sessions involving the UE; and means for transmitting the set of values to a second network entity via one or more capability transfer messages to enable the second network entity to store the set of values for subsequent positioning sessions involving the UE.

In an aspect, a second network entity includes means for receiving, from a first network entity, via one or more capability transfer messages, a set of values for a set of positioning capability parameters from one or more positioning capability reports of a user equipment (UE), wherein the set of values are non-variable for subsequent positioning sessions involving the UE.

In an aspect, a non-transitory computer-readable medium stores computer-executable instructions that, when executed by a user equipment (UE), cause the UE to: transmit one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a non-transitory computer-readable medium stores computer-executable instructions that, when executed by a network entity, cause the network entity to: receive one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

In an aspect, a non-transitory computer-readable medium stores computer-executable instructions that, when executed by a first network entity, cause the first network entity to: receive one or more positioning capability reports from a user equipment (UE), the one or more positioning capability reports including a set of values for a set of positioning capability parameters, wherein the set of values are non-variable for subsequent positioning sessions involving the UE; and transmit the set of values to a second network entity via one or more capability transfer messages to enable the second network entity to store the set of values for subsequent positioning sessions involving the UE.

In an aspect, a non-transitory computer-readable medium stores computer-executable instructions that, when executed by a second network entity, cause the second network entity to: receive, from a first network entity, via one or more capability transfer messages, a set of values for a set of positioning capability parameters from one or more positioning capability reports of a user equipment (UE), wherein the set of values are non-variable for subsequent positioning sessions involving the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 9 to 14 illustrate example methods of wireless communication, according to aspects of the disclosure.

DETAILED DESCRIPTION

Figure 1:
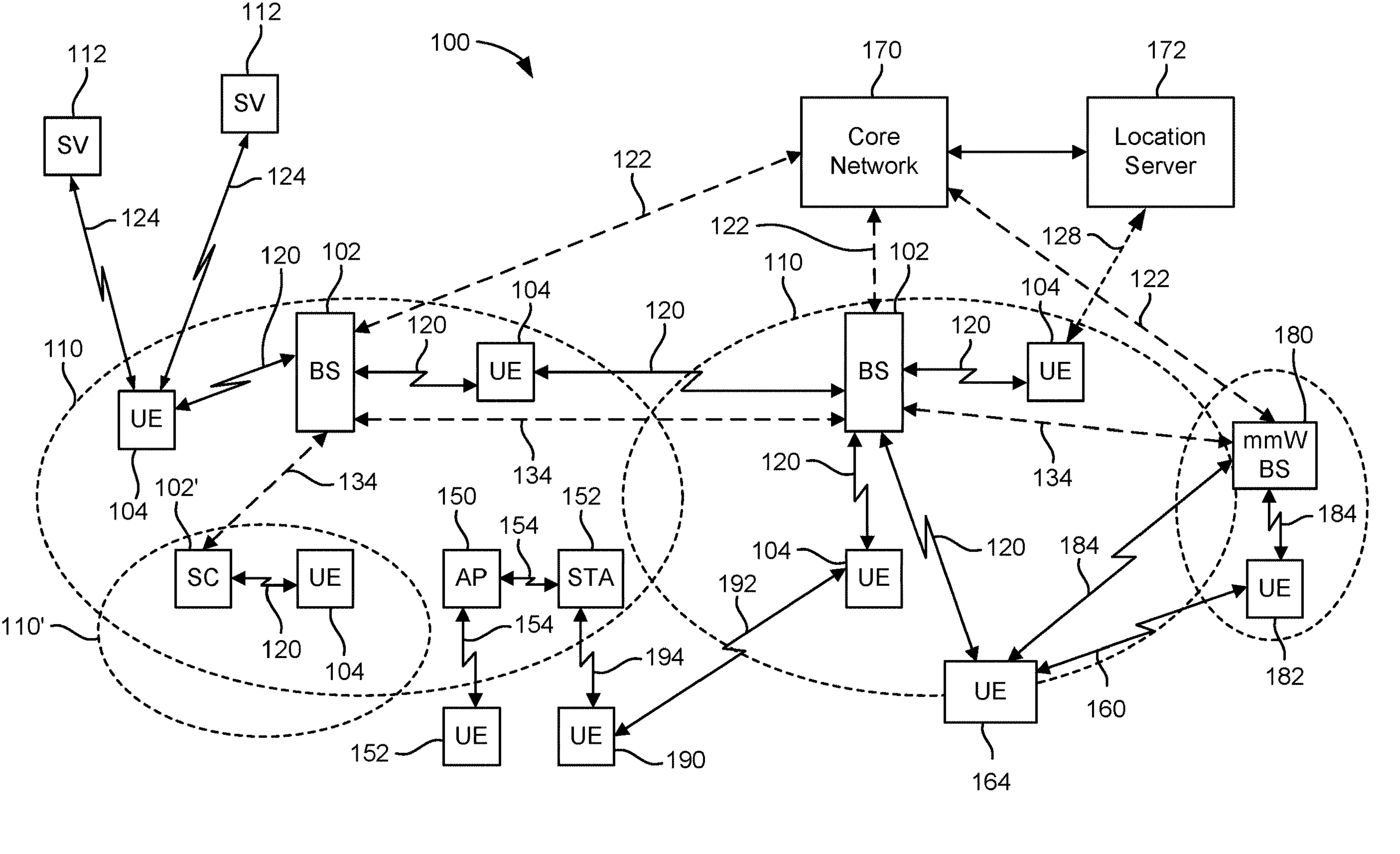
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
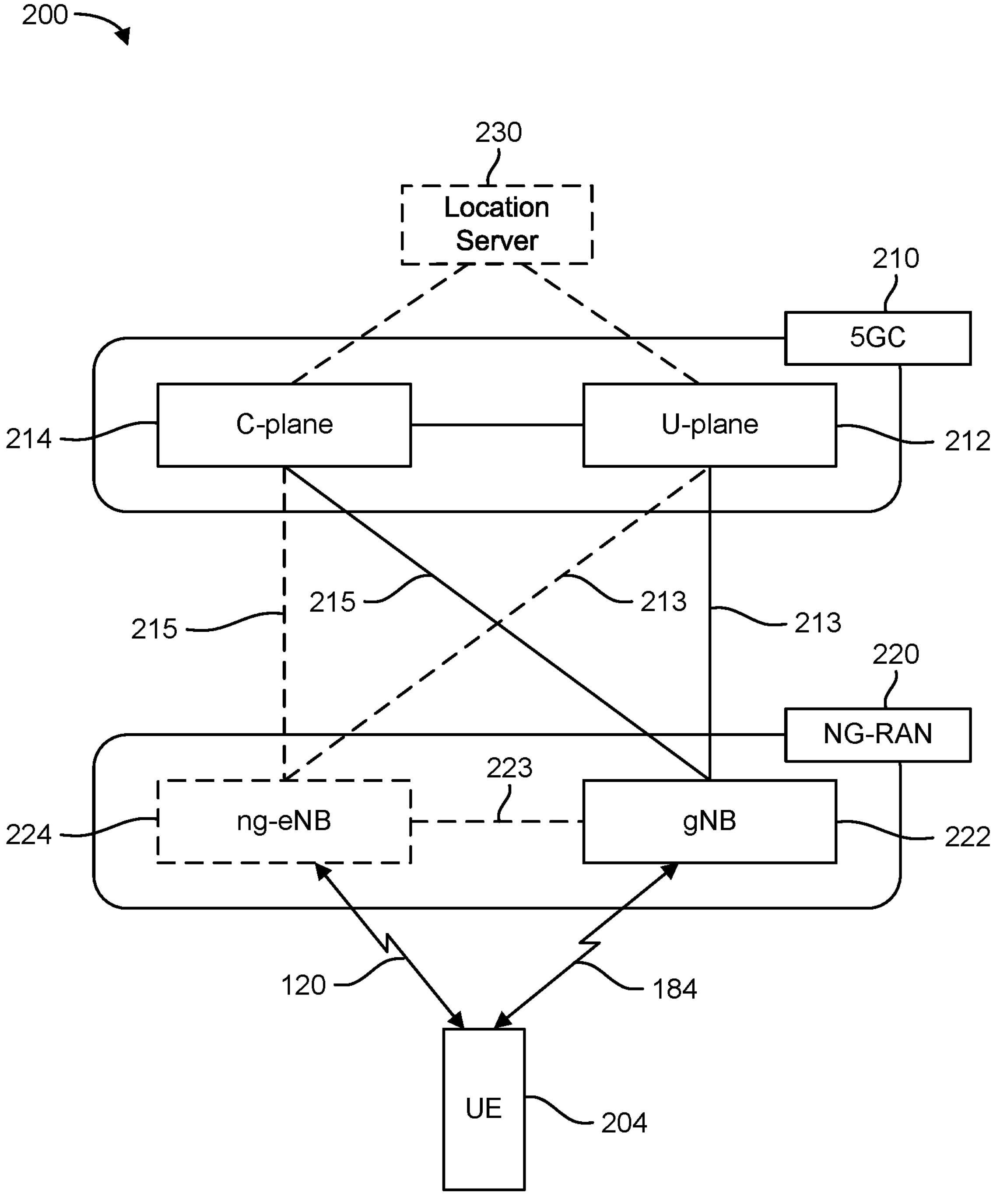
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
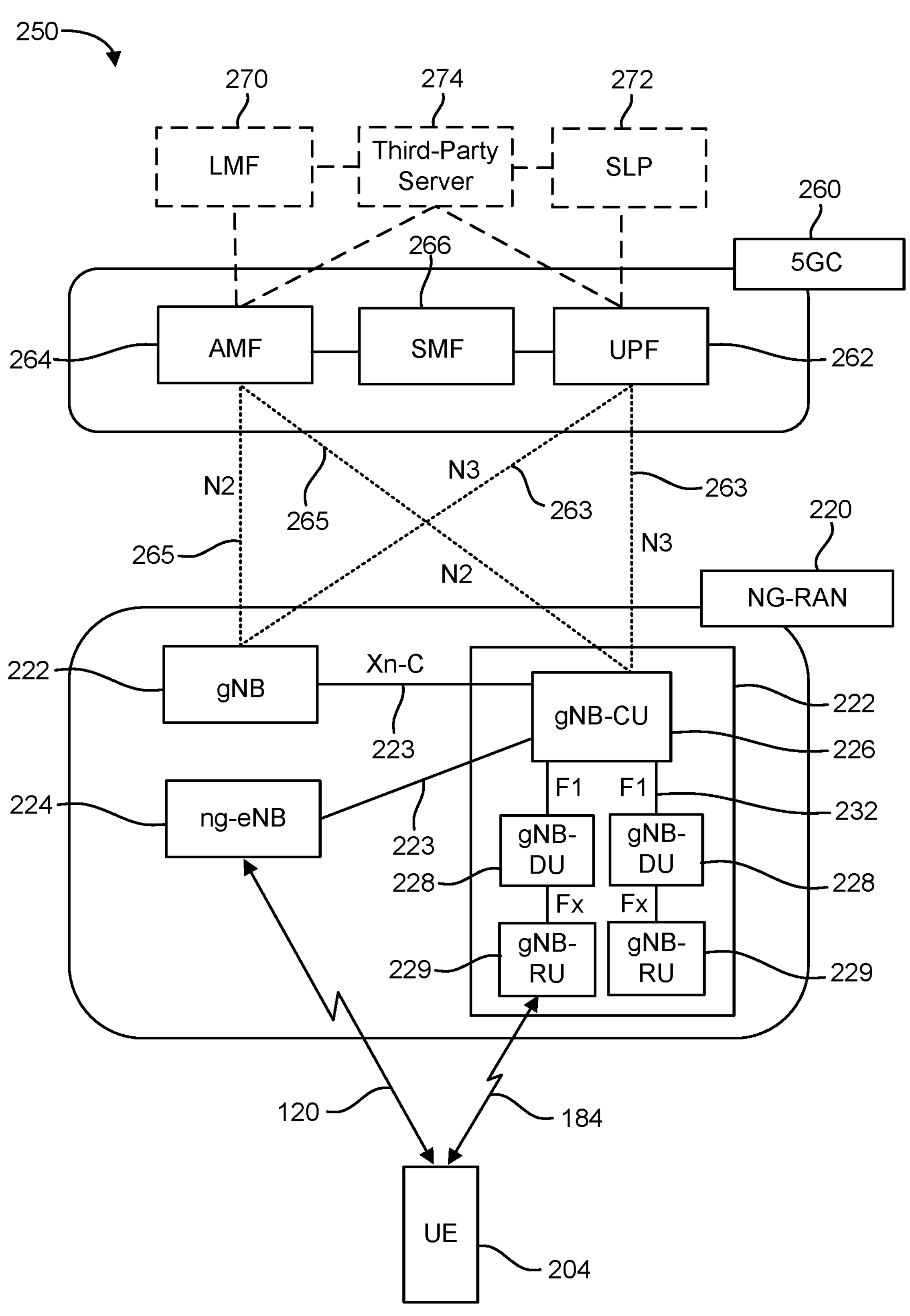

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
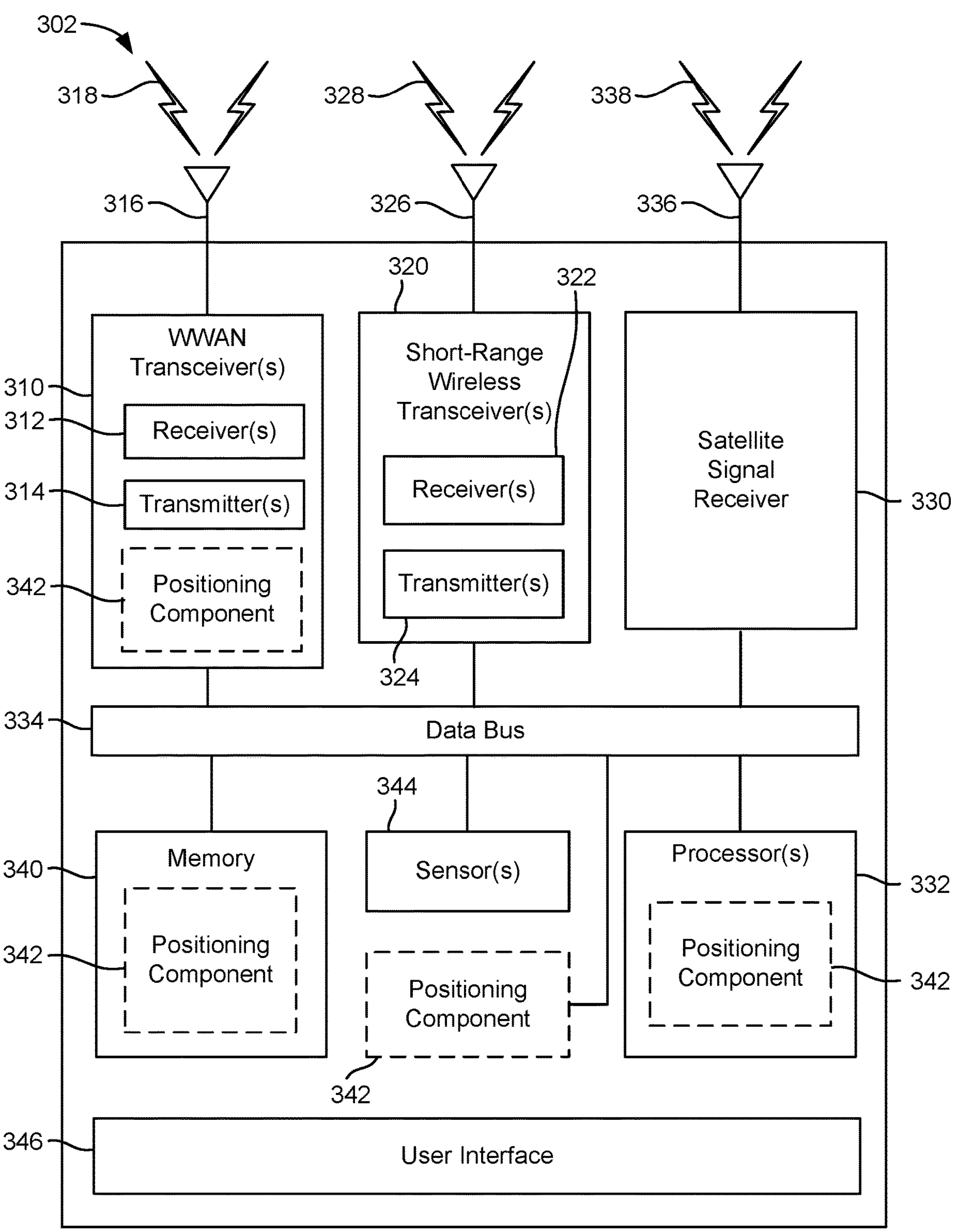
FIGS. 3A to 3C are simplified block diagrams of several sample aspects of components that may be employed in a user equipment (UE), a base station, and a network entity, respectively, and configured to support communications as taught herein.
Figure 3B:
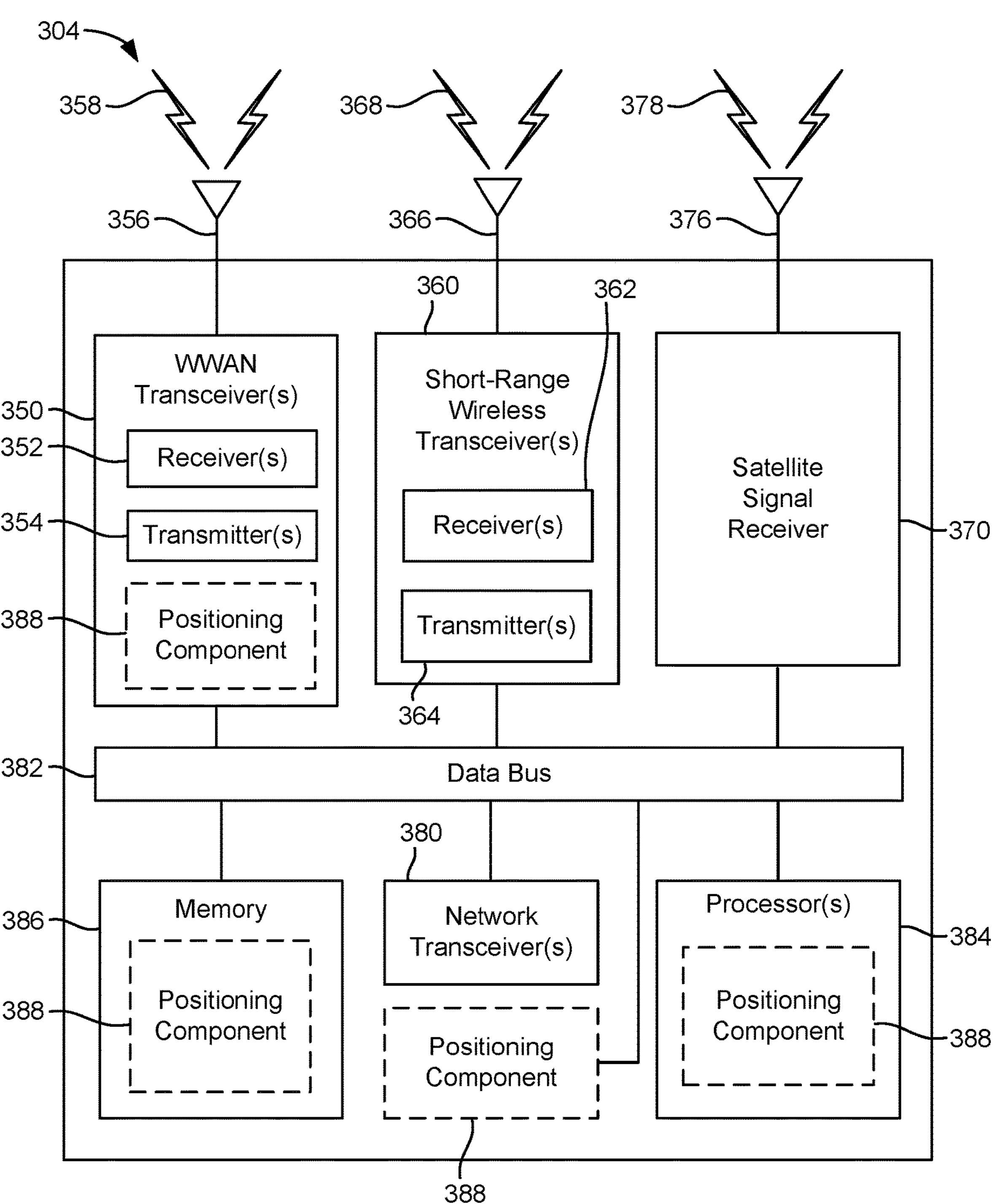
Figure 3C:
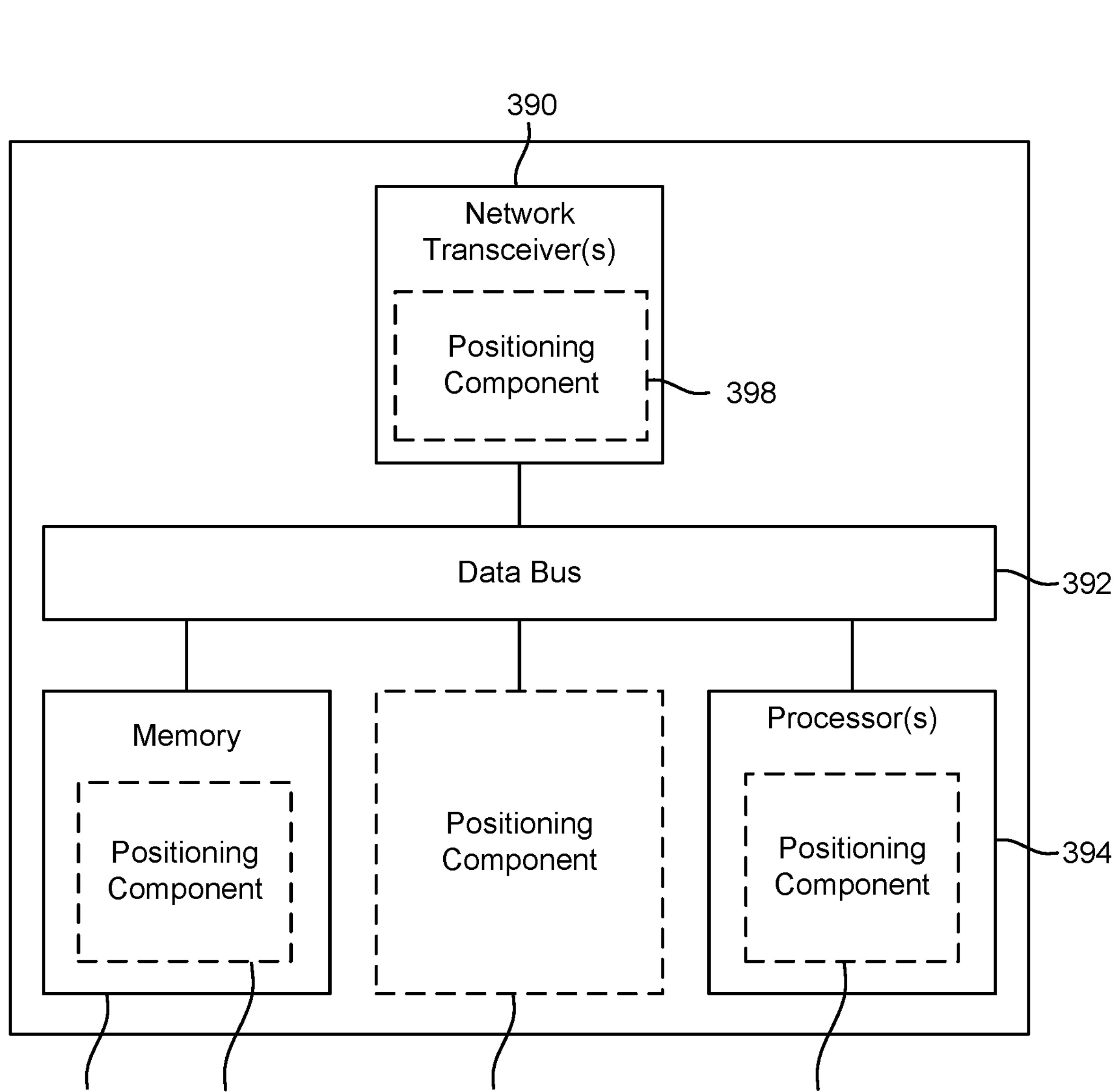

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of location services and positioning technologies, which have evolved over the various releases of the governing 3GPP standards. In Release 15 of the NR standards, location services were restricted to regulatory services, such as emergency calls and lawful intercept. In addition, Release 15 introduced the concept of a an LMF (which corresponds to the enhanced serving mobile location center (E-SMLC) in LTE). The supported positioning methods in Release 15 include RAT-independent methods, such as assisted global navigation satellite system (A-GNSS), metropolitan beacon system (MBS), terrestrial beacon system (TBS), motion sensors, WLAN, and Bluetooth, and RAT-dependent methods, such as LTE observed time difference of arrival (LTE-OTDOA) and LTE enhanced cell identifier (E-CID), as well as an NR cell ID method. Except for NR cell ID, no NR positioning methods were specified in Release 15.

Release 16 of the NR standards supports positioning services for roaming and commercial use cases, including mobile-terminated location requests (MT-LR), mobile-originated location requests (MO-LR), and deferred location requests for periodic, triggered, and UE available events. Release 16 also provides support for native 5GNR positioning methods, including downlink time difference of arrival (DL-TDOA), downlink angle of departure (DL-AoD), uplink time difference of arrival (UL-TDOA), uplink angle of arrival (UL-AoA), round-trip time (RTT) with one or more neighbouring base station (multi-RTT), and NR E-CID. Release 16 also introduced new downlink and uplink positioning reference signals (PRS), the broadcast of assistance data, and GNSS enhancements (e.g., state space representation (SSR) for precise point positioning (PPP) and real-time kinematic (RTK)).

The RAT-dependent positioning methods in Releases 15 and 16 are classified as downlink-based, uplink-based, and downlink-and-uplink-based. Downlink-based positioning methods include LTE-OTDOA (or simply OTDOA), DL-TDOA, and DL-AoD. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location.

A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
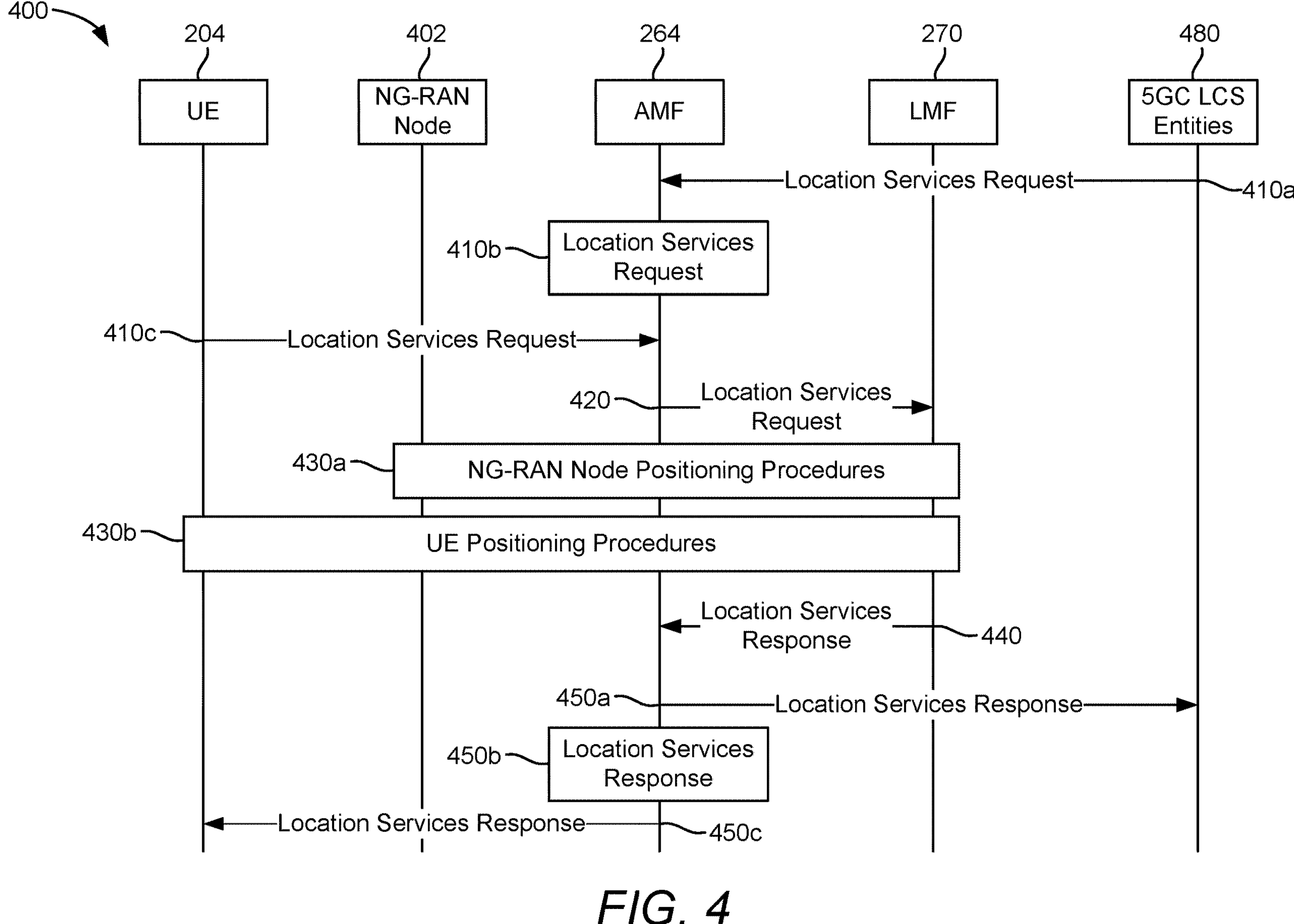
FIG. 4 illustrates an example positioning operation, according to aspects of the disclosure.

FIG. 4 illustrates an example UE positioning operation 400, according to aspects of the disclosure. The UE positioning operation 400 may be performed by a UE 204, an NG-RAN node 402 (e.g., gNB 222, gNB-CU 226, ng-eNB 224, or other node in the NG-RAN 220) in the NG-RAN 220, an AMF 264, an LMF 270, and a 5GC location services (LCS) entity 480 (e.g., any third-party application requesting the UE's 204 location, a public service access point (PSAP), an E-911 server, etc.).

A location services request to obtain the location of a target (i.e., UE 204) may be initiated by a 5GC LCS entity 480, the AMF 264 serving the UE 204, or the UE 204 itself. FIG. 4 illustrates these options as stages **410*a*, 410*b*, and 410*c*, respectively. Specifically, at stage 410*a*, a 5GC LCS entity 480 sends a location services request to the AMF 264. Alternatively, at stage 410*b*, the AMF 264 generates a location services request itself. Alternatively, at stage 410*c*, the UE 204 sends a location services request to the AMF 264**.

Once the AMF 264 has received (or generated) a location services request, it forwards the location services request to the LMF 270 at stage 420. The LMF 270 then performs NG-RAN positioning procedures with the NG-RAN node 402 at stage **430*a* and UE positioning procedures with the UE 204 at stage 430*b*. The specific NG-RAN positioning procedures and UE positioning procedures may depend on the type(s) of positioning method(s) used to locate the UE 204, which may depend on the capabilities of the UE 204**. The positioning method(s) may be downlink-based (e.g., LTE-OTDOA, DL-TDOA, DL-AoD, etc.), uplink-based (e.g., UL-TDOA, UL-AoA, etc.), and/or downlink-and-uplink-based (e.g., LTE/NR E-CID, multi-RTT, etc.), as described above. Corresponding positioning procedures are described in detail in 3GPP Technical Specification (TS) 38.305, which is publicly available and incorporated by reference herein in its entirety.

The NG-RAN positioning procedures and UE positioning procedures may utilize LTE positioning protocol (LPP) signaling between the UE 204 and the LMF 270 and LPP type A (LPPa) or New Radio positioning protocol type A (NRPPa) signaling between the NG-RAN node 402 and the LMF 270. LPP is used point-to-point between a location server (e.g., LMF 270) and a UE (e.g., UE 204) in order to obtain location-related measurements or a location estimate or to transfer assistance data. A single LPP session is used to support a single location request (e.g., for a single mobile-terminated location request (MT-LR), mobile-originated location request (MO-LR), or network induced location request (NI-LR)). Multiple LPP sessions can be used between the same endpoints to support multiple different location requests. Each LPP session comprises one or more LPP transactions, with each LPP transaction performing a single operation (e.g., capability exchange, assistance data transfer, location information transfer). LPP transactions are referred to as LPP procedures.

A prerequisite for stage 430 is that an LCS Correlation identifier (ID) and an AMF ID has been passed to the LMF 270 by the serving AMF 264. Both, the LCS Correlation ID and the AMF ID may be represented as a string of characters selected by the AMF 264. The LCS Correlation ID and the AMF ID are provided by the AMF 264 to the LMF 270 in the location services request at stage 420. When the LMF 270 then instigates stage 430, the LMF 270 also includes the LCS Correlation ID for this location session, together with the AMF ID, which indicates the AMF instance serving the UE 204. The LCS Correlation ID is used to ensure that during a positioning session between the LMF 270 and the UE 204, positioning response messages from the UE 204 are returned by the AMF 264 to the correct LMF 270 and carrying an indication (the LCS Correlation ID) that can be recognized by the LMF 270.

Note that the LCS Correlation ID serves as a location session identifier that may be used to identify messages exchanged between the AMF 264 and the LMF 270 for a particular location session for a UE 204, as described in greater detail in 3GPP TS 23.273, which is publicly available and incorporated by reference herein in its entirety. As mentioned above and shown in stage 420, a location session between an AMF 264 and an LMF 270 for a particular UE 204 is instigated by the AMF 264, and the LCS Correlation ID may be used to identify this location session (e.g., may be used by the AMF 264 to identify state information for this location session, etc.).

LPP positioning methods and associated signaling content are defined in the 3GPP LPP standard (3GPP TS 37.355, which is publicly available and incorporated by reference herein in its entirety). LPP signaling can be used to request and report measurements related to the following positioning methods: LTE-OTDOA, DL-TDOA, A-GNSS, E-CID, sensor, TBS, WLAN, Bluetooth, DL-AoD, UL-AoA, and multi-RTT. Currently, LPP measurement reports may contain the following measurements: (1) one or more ToA, TDOA, RSTD, or Rx-Tx time difference measurements, (2) one or more AoA and/or AoD measurements (currently only for a base station to report UL-AoA and DL-AoD to the LMF 270), (3) one or more multipath measurements (per-path ToA, RSRP, AoA/AoD), (4) one or more motion states (e.g., walking, driving, etc.) and trajectories (currently only for the UE 204), and (5) one or more report quality indications.

As part of the NG-RAN node positioning procedures (stage 430*a*) and UE positioning procedures (stage 430*b*), the LMF 270 may provide LPP assistance data in the form of downlink positioning reference signal (DL-PRS) configuration information to the NG-RAN node 402 and the UE 204 for the selected positioning method(s). Alternatively or additionally, the NG-RAN node 402 may provide DL-PRS and/or uplink PRS (UL-PRS) configuration information to the UE 204 for the selected positioning method(s). Note that while FIG. 4 illustrates a single NG-RAN node 402, there may be multiple NG-RAN nodes 402 involved in the positioning session.

Once configured with the DL-PRS and/or UL-PRS configurations, the NG-RAN node 402 and the UE 204 transmit and receive/measure the respective PRS at the scheduled times. The NG-RAN node 402 and the UE 204 then send their respective measurements to the LMF 270. In some cases, the NG-RAN node 402 may send its measurements to the UE 204, which may forward them to the LMF 270 using LPP signaling. Alternatively, the NG-RAN node 402 may send its measurements directly to the LMF 270 in LPPa or NRPPa signaling. In some cases, the UE 204 may send its measurements to the NG-RAN node 402 in RRC, uplink control information (UCI), or MAC control element (MAC-CE) signaling, and the NG-RAN node 402 may forward the measurements to the LMF 270 using LPPa or NRPPa signaling. Alternatively, the UE 204 may send its measurements directly to the LMF 270 using LPP signaling.

Once the LMF 270 obtains the measurements from the UE 204 and/or the NG-RAN node 402 (depending on the type(s) of positioning method(s)), it calculates an estimate of the UE's 204 location using those measurements. Then, at stage 440, the LMF 270 sends a location services response, which includes the location estimate for the UE 204, to the AMF 264. The AMF 264 then forwards the location services response to the entity that generated the location services request at stage 450. Specifically, if the location services request was received from a 5GC LCS entity 480 at stage 410*a*, then at stage 450*a*, the AMF 264 sends a location services response to the 5GC LCS entity 480. If, however, the location services request was received from the UE 204 at stage 410*c*, then at stage 450*c*, the AMF 264 sends a location services response to the UE 204. Or, if the AMF 264 generated the location services request at stage 410*b*, then at stage 450*b*, the AMF 264 stores/uses the location services response itself.

Note that although the foregoing has described the UE positioning operation 400 as a UE-assisted positioning operation, it may instead be a UE-based positioning operation. A UE-assisted positioning operation is one where the LMF 270 calculates the location of the UE 204, whereas a UE-based positioning operation is one where the UE 204 calculates its own location. In the case of a UE-based positioning operation, stages 410*c* and 450*c* would be performed. The LMF 270 may still coordinate the transmission/measurement of DL-PRS (and possibly UL-PRS), but the measurements would be forwarded to the UE 204 rather than the LMF 270. As such, the location services response at stages 440 and 450*c* may be the measurements from the involved NG-RAN node(s) 402 rather than a location estimate of the UE 204. Alternatively, where the involved NG-RAN node(s) 402 forward their respective measurements directly to the UE 204 (e.g., via RRC signaling), the location services response at stage 440 may simply be a confirmation that the NG-RAN node and UE positioning procedures at stage 430 are complete.

As can be seen from the foregoing, a positioning operation generally includes the following main stages: (a) sending a location request to a location server (e.g., LMF 270), (b) providing the DL-PRS and/or UL-PRS information for the positioning method(s) to the UE (e.g., UE 204) and/or base station(s) (e.g., NG-RAN node 402), (c) scheduling the measurements from the UE and/or base station(s), (d) waiting for the DL-PRS and/or UL-PRS transmissions to be sent, (e) obtaining measurements of the DL-PRS (from the UE) and/or UL-PRS (from the base station(s)), (f) sending the measurements to the location server (for UE-assisted) or the UE (for UE-based), (g) calculating the location estimate, and (h) sending the location estimate to the client (e.g., UE 204, AMF 264, or 5GC LCS entity 480).

One of the goals of NR positioning services is reduced latency. The time delay before completion of the location measurements (stages (a) to (d) above) may be referred to as "component A" delay. The delay to convert the location measurements into a location estimate and deliver the location estimate to a client (stages (e) to (h) above) may be referred to as "component B" delay. A very small latency for component B delay would allow a client to treat a location estimate as being "current," as there would be little time for location degradation due to mobility of the target UE (e.g., UE 204).

Figure 5:
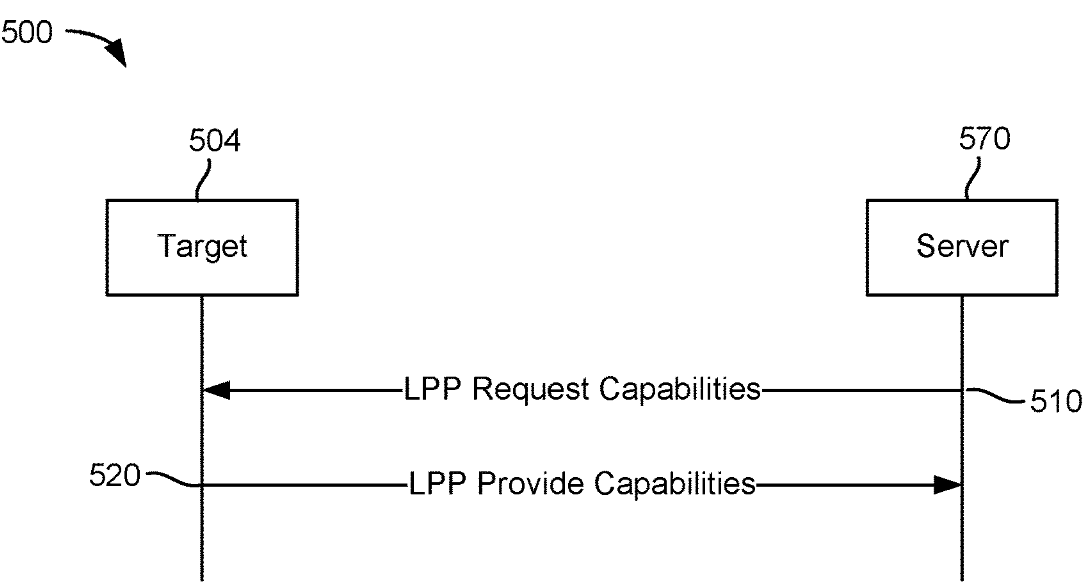
FIG. 5 illustrates an example Long-Term Evolution positioning protocol (LPP) capability transfer procedure, according to aspects of the disclosure.

Part of an LPP positioning procedure, as briefly noted above with respect to stage 430 of FIG. 4, is capability reporting. FIG. 5 illustrates an example LPP capability transfer procedure 500, according to aspects of the disclosure. The LPP capability transfer procedure 500 is performed between a target 504 (e.g., any of the UEs described herein) and a server 570 (e.g., location server 230, LMF 270, SLP 272). The target 504 and server 570 communicate via LPP signalling.

At stage 510, the server 570 sends an LPP Request Capabilities message to the target 504. The server 570 may indicate the types of capability(ies) needed. At 520, the target 504 responds with an LPP Provide Capabilities message. The capabilities should correspond to any capability types specified in stage 510. This message should also include the LPP "endTransaction" parameter set to TRUE.

More specifically, upon receiving a Request Capabilities message, the target 504 should generate the LPP Provide Capabilities message as a response. For each positioning method for which a request for capabilities is included in the Request Capabilities message, if the target 504 supports this positioning method, the target 504 includes the capabilities of the target 504 for that supported positioning method in the LPP Provide Capabilities response message. The target 504 should also set the "LPP-TransactionID" parameter in the LPP Provide Capabilities response message to the same value as the "LPP-TransactionID" parameter in the received Request Capabilities message. The target 504 should then deliver the LPP Provide Capabilities response message to lower layers for transmission to the server 570.

Figure 6:
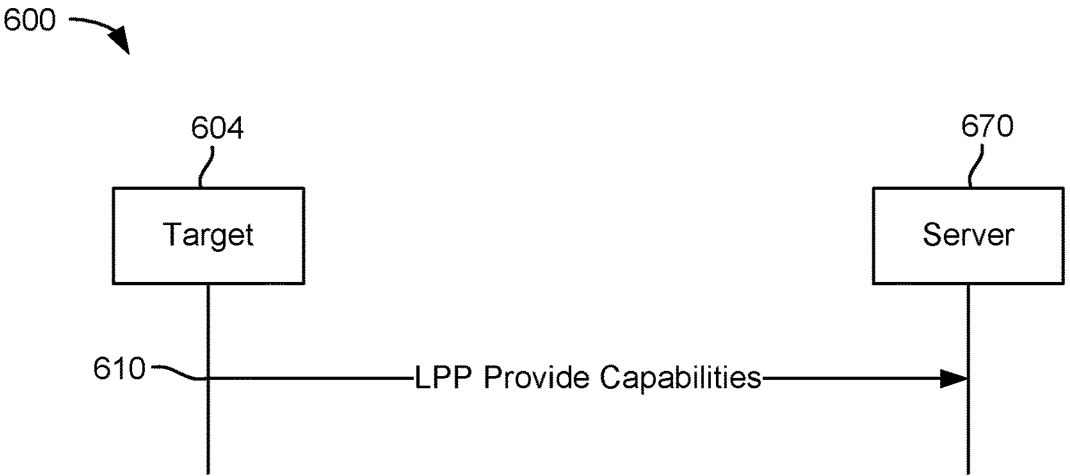
FIG. 6 illustrates an example LPP capability indication procedure, according to aspects of the disclosure.

Unlike the example of FIG. 5, positioning capabilities may also be unsolicited. FIG. 6 illustrates an example LPP capability indication procedure 600, according to aspects of the disclosure. The LPP capability indication procedure 600 is performed between a target 604 (e.g., any of the UEs described herein) and a server 670 (e.g., location server 230, LMF 270, SLP 272). The target 604 and server 670 communicate via LPP signalling. An LPP capability indication procedure 600 allows the target 604 to provide unsolicited capabilities to the server 670.

At 610, the target 604 sends an LPP Provide Capabilities message to the server 670. This message should include the LPP "endTransaction" parameter set to TRUE. More specifically, when triggered to transmit an LPP Provide Capabilities message, for each positioning method whose capabilities are to be indicated, the target 604 should set the corresponding information element (IE) to include the target's 604 capabilities. If OTDOA capabilities are to be indicated, the target 604 should include the IE "supportedBandListEUTRA." The target 604 should then deliver the LPP Provide Capabilities to lower layers for transmission.

A positioning procedure typically begins with an LPP capability exchange, such as an LPP capability transfer procedure 500 or an LPP capability indication procedure 600. Based on current assumptions, such a procedure can take 43 to 89 ms. To reduce latency, the capability exchange procedure can be avoided by storing UE positioning capabilities at the AMF (e.g., AMF 264) and/or the location server (e.g., location server 230, LMF 270, SLP 272). This provides a benefit of reducing the time-to-first-fix latency, but would only work for the "static" (i.e., non-variable) positioning capabilities (i.e., IE capabilities that do not change over time or with mobility).

Figure 7:
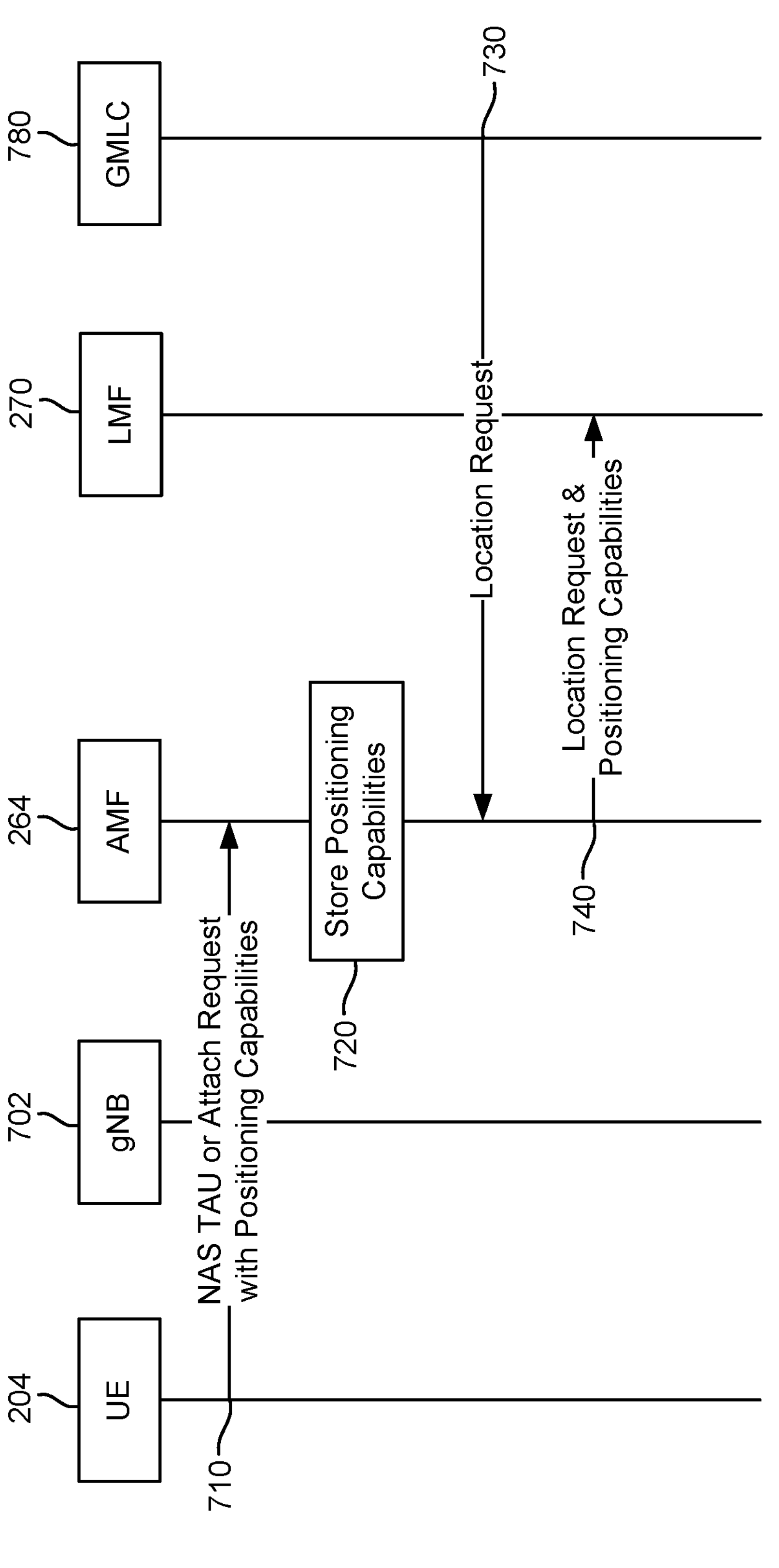
FIG. 7 illustrates an example capability storage procedure, according to aspects of the disclosure.

FIG. 7 illustrates an example capability storage procedure 700, according to aspects of the disclosure. The capability storage procedure 700 may be performed by a UE 204 (e.g., any of the UEs described herein), a gNB 702 (e.g., any of the base stations described herein), an AMF 264, an LMF 270, and a gateway mobile location center (GMLC) 780.

Where the UE's 204 positioning capabilities are expected to be saved in the network, the UE 204 may provide its capabilities as part of the first attach procedure or in a tracking area update (TAU) message after expiration of a timer. (A tracking area is a group of cells in which a UE in the RRC INACTIVE state is expected to be located when it transitions to the RRC CONNECTED state.) As such, at 710, the UE 204 sends a non-access stratum (NAS) TAU message or attach request to the AMF 264 (via the gNB 702) that includes the UE's 204 positioning capabilities.

At 720, the AMF 264 stores the UE's 204 positioning capabilities for future positioning sessions. At 730, the AMF 264 receives a location services request from a GMLC 780 (or other LCS entity), similar to stage 410*a* of FIG. 4. At 740, the AMF 264 sends a location services request to the LMF 270 that includes the UE's 204 stored positioning capabilities, similar to stage 420 of FIG. 4.

A drawback to storing a UE's positioning capabilities in the network (e.g., at the AMF) is that the UE may change its positioning capabilities over time for a variety of reasons. As a first reason that a UE's capabilities may change, there are certain capabilities for which a UE reports its capabilities based on its "current/active" configuration. For example, for SRS capabilities, the UE may have different capabilities for different frequency bands or based on the configured band combination; however, the LMF is not aware of the bands/band combinations that the UE is currently utilizing. Another reason that a UE's capabilities may change is for power savings. For example, a UE may advertise fewer PRS processing capabilities when it wants to save power. Another reason that a UE's capabilities may change is due to the UE's carrier aggregation configuration and available hardware/memory resources. For example, if the UE is configured with high carrier aggregation (i.e., the maximum, or close to the maximum, number of carriers the UE can aggregate), the UE may not have enough processing resources to complete both communication and positioning tasks. Another reason that a UE's capabilities may change is due to dual connectivity and shared antennas. Yet another reason that a UE's capabilities may change is user interaction. For example, if the user turns off location services on the UE, or a specific set of location services, the UE may not advertise any positioning capabilities to the network.

The present disclosure provides various techniques for storing UE capability information in the network that address the issue of changing (i.e., variable) UE capabilities. As a first technique, all reported capabilities may be stored, but the UE is permitted to send a different set of capability values if the capability request is for capabilities that will be stored in the network (e.g., non-variable capabilities to be stored at, for example, the AMF). For example, the UE may receive a capability request (e.g., an LPP Request Capabilities message, as at stage 510 of FIG. 5) for positioning capabilities to be stored in the network. The capability request may be received during a network attachment or TAU procedure (as at 710 of FIG. 7) and may not necessarily be associated with a positioning procedure. The capability request may include a flag to indicate that the positioning capabilities are to be stored in the network (e.g., are non-variable).

In an alternative aspect, a capability request for a given positioning session may indicate (e.g., via a flag) that the capabilities in the capability response (e.g., an LPP Provide Capabilities message, as at stage 520 of FIG. 5) will be stored at the network (in addition to being used for the positioning session). Or the UE may assume that any reported capabilities for a positioning session will be stored.

Whether or not a request for positioning capabilities is associated with a positioning session, a UE may report two sets of positioning capabilities in one or more capability reports, one set that may be stored in the network (e.g., non-variable capabilities), and one set that includes conventional capabilities values (e.g., variable capabilities). A UE may differentiate between the two sets of positioning capabilities using a flag associated with at least one set of positioning capabilities. For example, the UE may send two LPP Provide Capabilities messages, one with a flag indicating that the reported positioning capabilities can be stored (e.g., because they are non-variable), and one without a flag, indicating that the reported positioning capabilities should not be stored (e.g., because they are variable). Alternatively, the LPP Provide Capabilities message without the flag may include the positioning capabilities that can be stored.

In an aspect, the option of reporting different values for the to-be-stored (non-variable) positioning capabilities and the conventional positioning capabilities (variable) may be available to a subset of feature groups or capabilities. More specifically, NR defines a number of UE "feature groups" for the UE "feature" of NR positioning. For example, there is a "Common DL PRS Processing Capability" feature group that indicates the maximum DL PRS bandwidth in MHz that is supported and reported by the UE (FR1 bands: {5, 10, 20, 40, 50, 80, 100}; FR2 bands: {50, 100, 200, 400}), the DL PRS buffering capability (Type 1—sub-slot/symbol level buffering; or Type 2—slot level buffering), the duration of DL PRS symbols N in units of ms that a UE can process every T ms assuming maximum DL PRS bandwidth in MHz, that is supported and reported by the UE (T: {8, 16, 20, 30, 40, 80, 160, 320, 640, 1280} ms, N: {0.125, 0.25, 0.5, 1, 2, 4, 6, 8, 12, 16, 20, 25, 30, 32, 35, 40, 45, 50} ms), and the maximum number of DL PRS resources that the UE can process in a slot under it (FR1 bands: {1, 2, 4, 6, 8, 12, 16, 24, 32, 48, 64} for each subcarrier spacing (SCS): 15 kHz, 30 kHz, 60 kHz; FR2 bands: {1, 2, 4, 6, 8, 12, 16, 24, 32, 48, 64} for each SCS: 60 kHz, 120 kHz). Another feature group is the "DL PRS Resources for DL-TDOA" feature group, which indicates the maximum number of DL PRS resource sets per TRP per frequency layer supported by the UE (values={1, 2}), the maximum number of TRPs across all positioning frequency layers per UE (values={4, 6, 12, 16, 24, 32, 64, 128, 256}), and the maximum number of positioning frequency layers the UE supports (values={1, 2, 3, 4}). Yet another feature group is the "DL PRS Measurement Report for DL-TDOA" feature group, which indicates the DL RSTD measurements per pair of TRPs (values={1, 2, 3, 4}) and whether the UE supports DL PRS-RSRP measurements (Values={0, 1}). These and many other feature groups are defined in NR, and a UE reports its specific values in an LPP Provide Capabilities message.

Thus, when reporting its capabilities for a specific feature group, a UE may indicate whether or not the reported value(s) can be stored (e.g., are non-variable), or may report two sets of values, one to be stored and one to be used for the current positioning session (e.g., variable capabilities). More specifically, the UE may include a flag for each feature group indicating whether or not the value(s) for that feature group can be stored. Alternatively, if the UE reports two values (or sets of values) for a feature group, one of those values (or sets of values) may be stored and the other used for the current positioning session. Which set may be stored and which set may be used may be configured by applicable signaling or indicated in the applicable wireless communications standard. For example, it may be that the first set of values is to be stored (because they are non-variable) and the second set of values is to be used for the current positioning session (because they are variable).

In an aspect, where a feature group includes multiple parameters (e.g., as in the "Common DL PRS Processing Capability" feature group), a UE may indicate that certain values within the feature group can be stored but that others cannot. Or the UE may report to-be-stored and conventional values for some parameters within a feature group, or all of the parameters within the feature group.

In an aspect, a UE may indicate whether the positioning capabilities may be stored at the group of capabilities level. That is, the UE may associate a flag with a group of capabilities, and the flag may indicate whether or not all capabilities in that group may be stored.

In an aspect, the option of reporting different values for the to-be-stored (non-variable) positioning capabilities and the conventional (variable) positioning capabilities may be available for non-binary capabilities, whereas for binary capabilities (i.e., an indication of whether or not the UE supports a feature), the UE may need to follow the reported capability for both types of capabilities. That is, if a UE indicates that it can support a particular feature group in the to-be-stored capabilities, then it should always be able to support that feature group. A UE may, however, support different values within a feature group, as described above.

In an aspect, a UE may report more conservative capability values for the positioning capabilities that will be stored in the network than for the positioning capabilities that will be used for the current positioning session. For example, the conservative capability values may indicate the UE's positioning capabilities at any time (i.e., non-variable), whereas the capability values for the current positioning session may indicate the UE's current positioning capabilities (variable, as conventionally). For example, a UE may report that it can perform fewer PRS processing operations for to-be-stored capabilities compared to what it may report for a conventional request for capabilities associated with a positioning session.

Whether or not a UE receives a request for to-be-stored capabilities as part of a positioning procedure, for a subsequent positioning procedure, if the stored capabilities are sufficient for the subsequent positioning procedure, there is no need for another capability exchange. However, if the stored capabilities are not sufficient, the UE will need to perform another capability exchange (e.g., as illustrated in FIGS. 5 and 6). Where the stored capabilities are sufficient and no further capability exchange is necessary, this technique will decrease the latency of the positioning session. However, the stored capabilities may not always be sufficient, since they will likely be more conservative than what the UE is actually capable of at a particular instant.

As a second technique for storing UE capability information in the network, positioning capabilities to be stored in the network may be associated with a time-tag or expiration timer. Such an expiration timer may be for the entire capability structure (i.e., all UE positioning capabilities), or there may be different expiration timers for different components or feature groups. Upon expiration of the timer(s), the associated capabilities would be discarded. For any subsequent positioning procedures needing those capabilities, the network would need to send a new capabilities request to the UE.

The time-tag could be any indication of the time at which the capability report was generated in order to indicate how recent or stale the stored capabilities are. For example, the time-tag may be a system frame number (SFN) or other such timestamp. Alternatively, the time-tag may be an index that increments once per capability update. The index may wrap around (i.e., return to '0') when a maximum value is reached. The index may be like the packet sequence number used in upper layers to address out-of-order delivery due to HARQ. In an aspect, there may be separate indexing for different subsets (feature groups) of the UE's positioning capabilities, as with the different timers for different feature groups.

As a third technique for storing UE capability information in the network, there may be standardized behavior for the inter-network-node exchange of stored positioning capabilities. Specifically, a capability transfer message protocol may be defined for this purpose. Such capability transfer messaging may be similar to LPP signaling, insofar as there may be specific messages transmitted between a UE and the location server, between the base station(s) and the location server, between base stations, etc. The appropriate capability transfer messages may then be used to move the UE's positioning capabilities from one network node (e.g., gNB, AMF, LMF, LMF-in-RAN, etc.) to another. In an aspect, if all positioning capability storage is at the location server (e.g., LMF), then the procedure would be transparent to AMF changes (due to UE mobility). Instead, for UE mobility scenarios, all capabilities would be transferred from the UE's old LMF to its new LMF.

Figure 8:
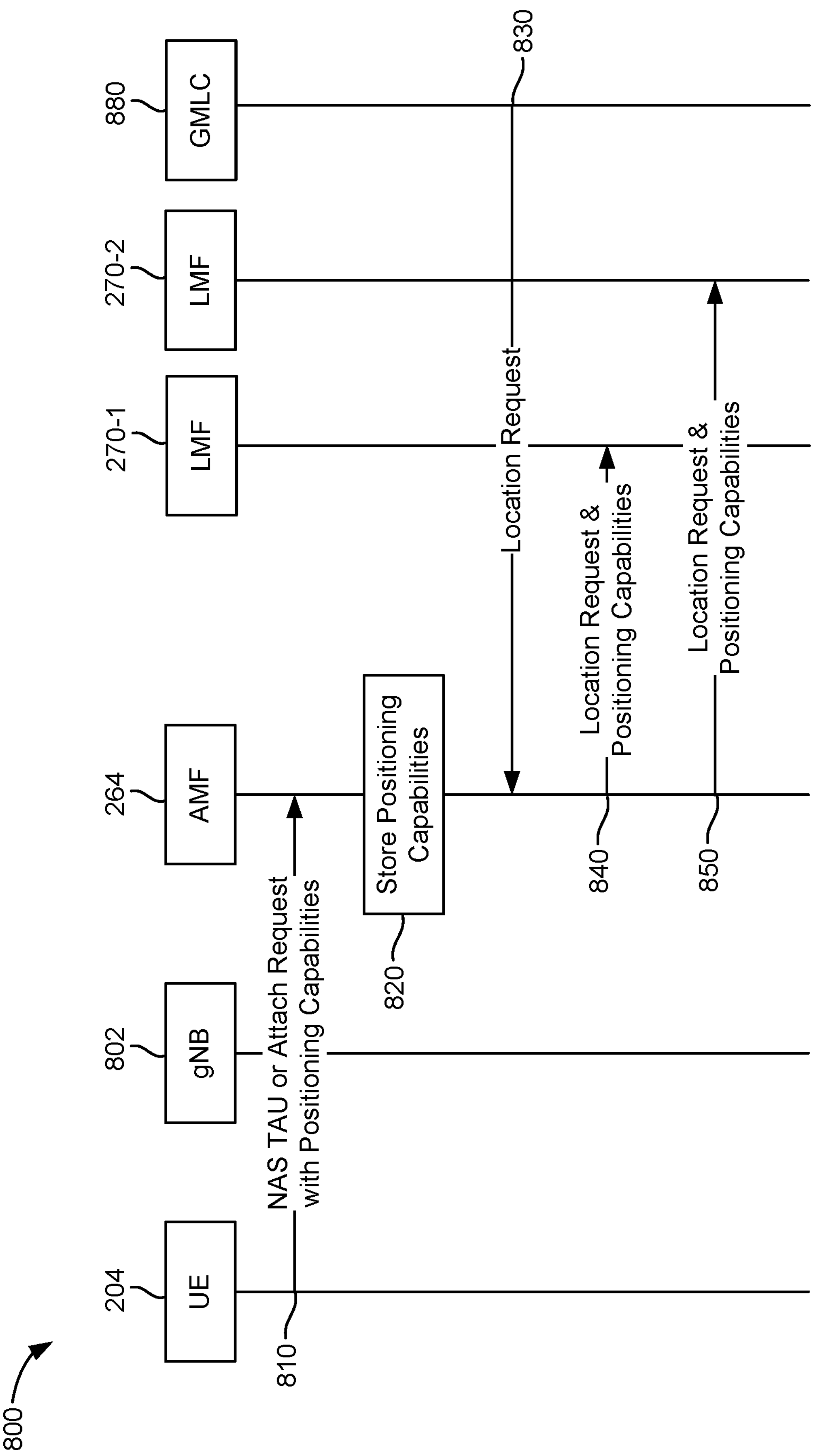
FIG. 8 illustrates an example capability storage procedure when a UE's location server changes due to mobility, according to aspects of the disclosure.

FIG. 8 illustrates an example capability storage procedure 800 when a UE's LMF changes due to mobility, according to aspects of the disclosure. The capability storage procedure 800 may be performed by a UE 204 (e.g., any of the UEs described herein), a gNB 802 (e.g., any of the base stations described herein), an AMF 264, a first LMF 270-1 (e.g., an LMF 270), a second LMF 270-2 (e.g., an LMF 270), and a GMLC 880.

Operations 810 to 840 are the same as operations 710 to 740 in FIG. 7. Specifically, where the UE's 204 positioning capabilities are expected to be saved in the network (because they are non-variable), the UE 204 may provide its capabilities as part of the first attach procedure or in a TAU message after expiration of a timer. As such, at 810, the UE 204 sends a NAS TAU message or attach request to the AMF 264 (via the gNB 802) that includes the UE's 204 (non-variable) positioning capabilities.

At 820, the AMF 264 stores the UE's 204 positioning capabilities for future positioning sessions. At 830, the AMF 264 receives a location services request from a GMLC 880 (or other LCS entity), similar to stage 410*a* of FIG. 4. At 850, the AMF 264 sends a location services request to the LMF 270-1 that includes the UE's 204 stored positioning capabilities, similar to stage 420 of FIG. 4. At some point, during or after the positioning session, the UE's 204 LMF changes from LMF 270-1 to LMF 270-2. As such, the AMF 264 sends a location services request to the LMF 270-2 that includes the UE's 204 stored positioning capabilities.

As a fourth technique for storing UE capability information in the network, only changes to capabilities are reported in subsequent capability reports. As a first option, a UE can send a conventional capabilities report that includes positioning capabilities that are not permitted to be stored (i.e., a capabilities report that includes the UE's current, or instantaneous/variable, positioning capabilities). Subsequently, for positioning capabilities that are to be stored in the network (non-variable capabilities), the UE can send difference values between the values of the reported capabilities and the values of the capabilities to be stored. In an aspect, the UE can report these delta values per feature group.

As a second option, the UE can send a conventional capabilities report that includes positioning capabilities that are permitted to be stored in the network (i.e., non-variable capabilities). These would be the UE's long-term capabilities, which may be more conservative than its current, or instantaneous/variable, capabilities. Subsequently, for positioning capabilities that are to be used for a positioning session, the UE can send difference values between the values of the reported capabilities and the values of the (variable) capabilities to be used for positioning. In an aspect, the UE can report these delta values per feature group.

FIG. 9 illustrates an example method 900 of wireless communication, according to aspects of the disclosure. In an aspect, method 900 may be performed by a UE (e.g., any of the UEs described herein).

At 910, the UE transmits one or more positioning capability reports to a location server (e.g., LMF 470, LMF 770, etc.), as at 520 of FIG. 5, 610 of FIG. 6, 710 of FIG. 7. The one or more positioning capability reports may include a first set of values for a set of positioning capability parameters and a second set of values for the set of positioning capability parameters, wherein the first set of values indicate variable positioning capabilities of the UE represented by the set of positioning capability parameters (e.g., capabilities that the network is not allowed to store, legacy capabilities, current capabilities, or capabilities for a single positioning session), and wherein the second set of values indicate non-variable positioning capabilities of the UE represented by the set of positioning capability parameters. In an aspect, operation 910 may be performed by the one or more WWAN transceivers 310, the one or more processors 332, memory 340, and/or positioning component 342, any or all of which may be considered means for performing this operation.

FIG. 10 illustrates an example method 1000 of wireless communication, according to aspects of the disclosure. In an aspect, the method 1000 may be performed by a network entity (e.g., a base station, an AMF, an LMF, etc.).

At 1010, the network entity receives one or more positioning capability reports from a UE (e.g., any of the UEs described herein), as at 520 of FIG. 5, 610 of FIG. 6, 710 of FIG. 7. The one or more positioning capability reports may include a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters. In an aspect, where the network entity is a base station, operation 1010 may be performed by the one or more WWAN transceivers 350, the one or more short-range wireless transceivers 360, the one or more processors 384, memory 386, and/or positioning component 388, any or all of which may be considered means for performing this operation. Alternatively, operation 1010 may be performed by the one or more network interfaces 390, the one or more processors 394, memory 396, and/or positioning component 398, any or all of which may be considered means for performing this operation.

Figure 11:
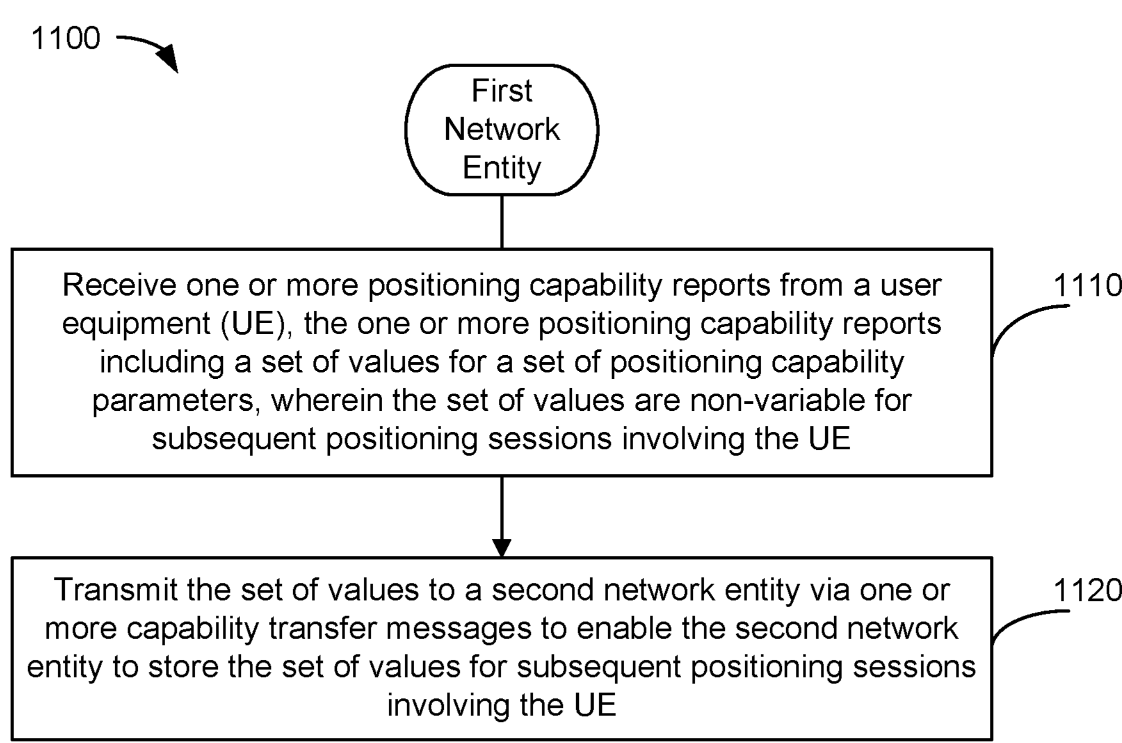

FIG. 11 illustrates an example method 1100 of wireless communication, according to aspects of the disclosure. In an aspect, the method 1100 may be performed by a first network entity (e.g., a base station, an AMF, an LMF, etc.).

At 1110, the first network entity receives one or more positioning capability reports from a UE (e.g., any of the UEs described herein), the one or more positioning capability reports including a set of values for a set of positioning capability parameters, wherein the set of values are non-variable for subsequent positioning sessions involving the UE. In an aspect, where the first network entity is a base station, operation 1110 may be performed by the one or more WWAN transceivers 350, the one or more short-range wireless transceivers 360, the one or more processors 384, memory 386, and/or positioning component 388, any or all of which may be considered means for performing this operation. Alternatively, operation 1110 may be performed by the one or more network interfaces 390, the one or more processors 394, memory 396, and/or positioning component 398, any or all of which may be considered means for performing this operation.

At 1120, the first network entity transmits the set of values to a second network entity (e.g., a base station, an AMF, an LMF, etc.) via one or more capability transfer messages to enable the second network entity to store the set of values for subsequent positioning sessions involving the UE. In an aspect, where the first network entity is a base station, operation 1120 may be performed by the one or more WWAN transceivers 350, the one or more short-range wireless transceivers 360, the one or more processors 384, memory 386, and/or positioning component 388, any or all of which may be considered means for performing this operation. Alternatively, operation 1120 may be performed by the one or more network interfaces 390, the one or more processors 394, memory 396, and/or positioning component 398, any or all of which may be considered means for performing this operation.

Figure 12:
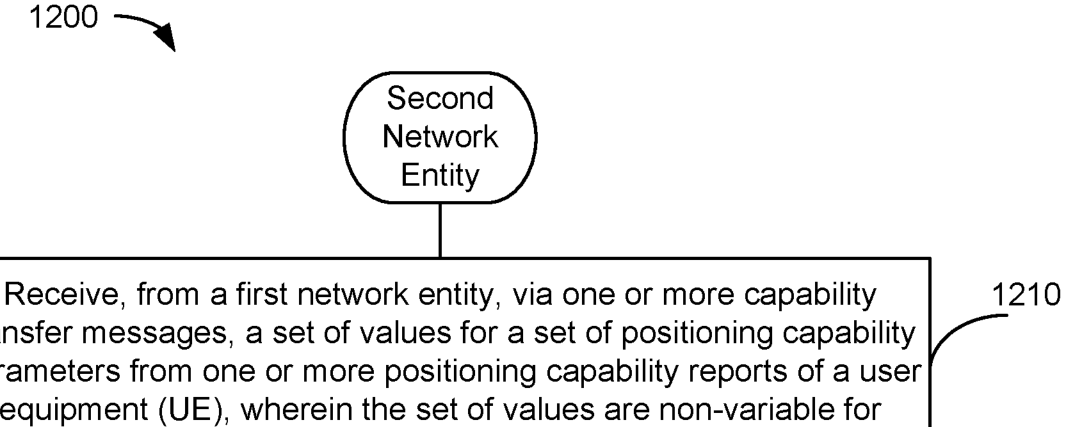

FIG. 12 illustrates an example method 1200 of wireless communication, according to aspects of the disclosure. In an aspect, the method 1200 may be performed by a second network entity (e.g., a base station, an AMF, an LMF, etc.).

At 1210, the second network entity receives, from a first network entity (e.g., a base station, an AMF, an LMF, etc.), via one or more capability transfer messages, a set of values for a set of positioning capability parameters from one or more positioning capability reports of a user equipment (UE), wherein the set of values are non-variable for subsequent positioning sessions involving the UE. In an aspect, where the second network entity is a base station, operation 1210 may be performed by the one or more WWAN transceivers 350, the one or more short-range wireless transceivers 360, the one or more processors 384, memory 386, and/or positioning component 388, any or all of which may be considered means for performing this operation. Alternatively, operation 1210 may be performed by the one or more network interfaces 390, the one or more processors 394, memory 396, and/or positioning component 398, any or all of which may be considered means for performing this operation.

FIG. 13 illustrates an example method 1300 of wireless communication, according to aspects of the disclosure. In an aspect, the method 1300 may be performed by a UE (e.g., any of the UEs described herein).

At 1310, the UE transmits one or more positioning capability reports to a location server (e.g., LMF 470, LMF 770, etc.), as at 520 of FIG. 5, 610 of FIG. 6, 710 of FIG. 7. The one or more positioning capability reports may include a set of values for a set of positioning capability parameters, the set of values to be stored by a network entity for subsequent positioning sessions, and the set of values associated with at least one time-tag, at least one expiration timer, or both. In an aspect, operation 1110 may be performed by the one or more WWAN transceivers 310, the one or more short-range wireless transceivers 320, the one or more processors 332, memory 340, and/or positioning component 342, any or all of which may be considered means for performing this operation.

FIG. 14 illustrates an example method 1400 of wireless communication, according to aspects of the disclosure. In an aspect, the method 1400 may be performed by a network entity (e.g., a base station, an AMF, an LMF, etc.).

At 1410, the network entity receives one or more positioning capability reports from a UE (e.g., any of the UEs described herein), as at 520 of FIG. 5, 610 of FIG. 6, 710 of FIG. 7. The one or more positioning capability reports may include a set of values for a set of positioning capability parameters, the set of values to be stored by a network entity for subsequent positioning sessions, and the set of values associated with at least one time-tag, at least one expiration timer, or both. In an aspect, where the network entity is a base station, operation 1010 may be performed by the one or more WWAN transceivers 350, the one or more short-range wireless transceivers 360, the one or more processors 384, memory 386, and/or positioning component 388, any or all of which may be considered means for performing this operation. Alternatively, operation 1010 may be performed by the one or more network interfaces 390, the one or more processors 394, memory 396, and/or positioning component 398, any or all of which may be considered means for performing this operation.

As will be appreciated, a technical advantage of the methods 900 to 1400 is decreased positioning latency (due to the network storage of the UE's capability parameters) while allowing the UE to maintain flexibility to adapt its positioning capabilities across time.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: transmitting one or more positioning capability reports to a location server, the one or more positioning capability reports including a first set of values for a set of positioning capability parameters and a second set of values for the set of positioning capability parameters, wherein the first set of values indicate first positioning capabilities of the UE represented by the set of positioning capability parameters, and wherein the second set of values indicate positioning capabilities of the UE represented by the set of positioning capability parameters to be stored by a network entity for subsequent positioning sessions.

Clause 2. The method of clause 1, further comprising: receiving a positioning capability request from the location server, the positioning capability request indicating the set of positioning capability parameters.

Clause 3. The method of clause 2, wherein the positioning capability request includes a flag indicating that values of the set of positioning capability parameters will be stored by the network entity.

Clause 4. The method of clause 3, wherein the UE transmits the one or more positioning capability reports including the first and second sets of values in response to the positioning capability request including the flag.

Clause 5. The method of any of clauses 1 to 4, wherein the one or more positioning capability reports includes a flag indicating that the second set of values indicate positioning capabilities of the UE represented by the set of positioning capability parameters to be stored by the network entity for subsequent positioning sessions.

Clause 6. The method of any of clauses 1 to 5, wherein the second set of values is a subset of values for the set of positioning capability parameters.

Clause 7. The method of clause 6, wherein each value of the subset of values is associated with a flag indicating that the value is to be stored by the network entity for subsequent positioning sessions.

Clause 8. The method of any of clauses 6 to 7, wherein the first set of values is a different set of values for the subset of values for the set of positioning capability parameters.

Clause 9. The method of any of clauses 1 to 8, wherein one or more capabilities of the set of positioning capabilities are binary capabilities.

Clause 10. The method of clause 9, wherein the first set of values and the second set of values each include different values for the one or more capabilities.

Clause 11. The method of clause 9, wherein the first set of values and the second set of values each include the same values for the one or more capabilities.

Clause 12. The method of any of clauses 1 to 11, wherein: the first set of values represent positioning capabilities that the UE is only capable of providing for a limited time, and the second set of values represent positioning capabilities that the UE is always capable of providing.

Clause 13. The method of any of clauses 1 to 12, wherein the second set of values are differential values relative to the first set of values.

Clause 14. The method of any of clauses 1 to 12, wherein the first set of values are differential values relative to the second set of values.

Clause 15. The method of any of clauses 1 to 14, wherein the network entity is an access and mobility management function (AMF).

Clause 16. A method of wireless communication performed by a network entity, comprising: receiving one or more positioning capability reports from a user equipment (UE), the one or more positioning capability reports including a first set of values for a set of positioning capability parameters and a second set of values for the set of positioning capability parameters, wherein the first set of values indicate first positioning capabilities of the UE represented by the set of positioning capability parameters, and wherein the second set of values indicate positioning capabilities of the UE represented by the set of positioning capability parameters to be stored by a network entity for subsequent positioning sessions.

Clause 17. The method of clause 16, wherein the network entity is a location server, the method further comprising: transmitting a positioning capability request to the UE, the positioning capability request indicating the set of positioning capability parameters.

Clause 18. The method of clause 17, wherein the positioning capability request includes a flag indicating that values of the set of positioning capability parameters will be stored by the network entity.

Clause 19. The method of any of clauses 16 to 18, wherein the one or more positioning capability reports includes a flag indicating that the second set of values indicate positioning capabilities of the UE represented by the set of positioning capability parameters to be stored by the network entity for subsequent positioning sessions.

Clause 20. The method of any of clauses 16 to 19, wherein the second set of values is a subset of values for the set of positioning capability parameters.

Clause 21. The method of clause 20, wherein each value of the subset of values is associated with a flag indicating that the value is to be stored by the network entity for subsequent positioning sessions.

Clause 22. The method of any of clauses 20 to 21, wherein the first set of values is a different set of values for the subset of values for the set of positioning capability parameters.

Clause 23. The method of any of clauses 20 to 22, wherein one or more capabilities of the set of positioning capabilities are binary capabilities.

Clause 24. The method of clause 23, wherein the first set of values and the second set of values each include different values for the one or more capabilities.

Clause 25. The method of clause 23, wherein the first set of values and the second set of values each include the same values for the one or more capabilities.

Clause 26. The method of any of clauses 16 to 25, wherein: the first set of values represent positioning capabilities that the UE is only capable of providing for a limited time, and the second set of values represent positioning capabilities that the UE is always capable of providing.

Clause 27. The method of any of clauses 16 to 26, wherein the second set of values are differential values relative to the first set of values.

Clause 28. The method of any of clauses 16 to 26, wherein the first set of values are differential values relative to the second set of values.

Clause 29. The method of any of clauses 16 to 28, wherein the network entity is an access and mobility management function (AMF).

Clause 30. A method of wireless communication performed by a user equipment (UE), comprising: transmitting one or more positioning capability reports to a location server, the one or more positioning capability reports including a set of values for a set of positioning capability parameters, wherein the set of values are to be stored by a network entity for subsequent positioning sessions, and wherein the set of values is associated with at least one time-tag, at least one expiration timer, or both.

Clause 31. The method of clause 30, wherein the at least one time-tag is at least one index representing a sequential number of the one or more positioning capability reports.

Clause 32. The method of clause 31, wherein the at least one index increments with each subsequent positioning capability report transmission.

Clause 33. The method of clause 32, wherein the at least one index returns to zero upon reaching a maximum value.

Clause 34. The method of clause 30, wherein the at least one time-tag is a timestamp.

Clause 35. The method of any of clauses 30 to 34, wherein the at least one expiration timer indicates a period of time during which the set of values are valid.

Clause 36. The method of any of clauses 30 to 35, wherein the at least one time-tag, the at least one expiration timer, or both comprise a time-tag, an expiration timer, or both for each value of the set of values.

Clause 37. The method of any of clauses 30 to 36, wherein: the set of values comprises a plurality of groups of values for the set of positioning capability parameters, and the at least one time-tag, the at least one expiration timer, or both comprise a time-tag, an expiration timer, or both for each group of values of the plurality of groups of values.

Clause 38. The method of any of clauses 30 to 37, wherein the network entity is an access and mobility management function (AMF).

Clause 39. The method of any of clauses 30 to 38, further comprising: receiving a positioning capability request from the location server, the positioning capability request indicating the set of positioning capability parameters.

Clause 40. A method of wireless communication performed by a network entity, comprising: receiving one or more positioning capability reports from a user equipment (UE), the one or more positioning capability reports including a set of values for a set of positioning capability parameters, wherein the set of values are to be stored by a network entity for subsequent positioning sessions, and wherein the set of values is associated with at least one time-tag, at least one expiration timer, or both.

Clause 41. The method of clause 40, wherein the at least one time-tag is at least one index representing a sequential number of the one or more positioning capability reports.

Clause 42. The method of clause 41, wherein the at least one index increments with each subsequent positioning capability report transmission.

Clause 43. The method of clause 42, wherein the at least one index returns to zero upon reaching a maximum value.

Clause 44. The method of clause 40, wherein the at least one time-tag is a timestamp.

Clause 45. The method of any of clauses 40 to 44, wherein the at least one expiration timer indicates a period of time during which the set of values are valid.

Clause 46. The method of any of clauses 40 to 45, wherein the at least one time-tag, the at least one expiration timer, or both comprise a time-tag, an expiration timer, or both for each value of the set of values.

Clause 47. The method of any of clauses 40 to 46, wherein: the set of values comprises a plurality of groups of values for the set of positioning capability parameters, and the at least one time-tag, the at least one expiration timer, or both comprise a time-tag, an expiration timer, or both for each group of values of the plurality of groups of values.

Clause 48. The method of any of clauses 40 to 47, wherein the network entity is an access and mobility management function (AMF).

Clause 49. The method of any of clauses 40 to 48, further comprising: discarding the set of values of the set of positioning capability parameters upon expiration of the at least one expiration timer.

Clause 50. The method of clause 49, further comprising: transmitting, in response to expiration of the at least one expiration timer, a positioning capability request to the UE, the positioning capability request indicating the set of positioning capability parameters.

Clause 51. A method of wireless communication performed by a first network entity, comprising: receiving one or more positioning capability reports from a user equipment (UE), the one or more positioning capability reports including a set of values for a set of positioning capability parameters, wherein the set of values are to be stored for subsequent positioning sessions; and transmitting the set of values to a second network entity via one or more capability transfer messages.

Clause 52. The method of clause 51, wherein the first network entity is an access and mobility management function (AMF).

Clause 53. The method of clause 52, wherein the second network entity is a first location server.

Clause 54. The method of clause 53, further comprising: transmitting the set of values to a second location server via one or more capability transfer messages based on the UE switching from the first location server to a second location server due to mobility of the UE.

Clause 55. The method of clause 51, wherein: the first network entity is a first base station, a first AMF, or a first location management function (LMF), and the second network entity is a second base station, a second AMF, or a second LMF.

Clause 56. An apparatus comprising a memory and at least one processor communicatively coupled to the memory, the memory and the at least one processor configured to perform a method according to any of clauses 1 to 55.

Clause 57. An apparatus comprising means for performing a method according to any of clauses 1 to 55.

Clause 58. A non-transitory computer-readable medium storing computer-executable instructions, the computer-executable comprising at least one instruction for causing a computer or processor to perform a method according to any of clauses 1 to 55.

Additional implementation examples are described in the following numbered clauses:

Clause 1. A method of wireless communication performed by a user equipment (UE), comprising: transmitting one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 2. The method of clause 1, further comprising: receiving a positioning capability request from the location server, the positioning capability request indicating the set of positioning capability parameters.

Clause 3. The method of clause 2, wherein the positioning capability request includes a flag indicating that values of the set of positioning capability parameters will be stored by a network entity.

Clause 4. The method of clause 3, wherein the one or more positioning capability reports including the first set of values and the second set of values are transmitted in response to the positioning capability request including the flag.

Clause 5. The method of any of clauses 1 to 4, wherein the one or more positioning capability reports include a flag indicating that the second set of values indicate positioning capabilities of the UE represented by the set of positioning capability parameters to be stored by a network entity for subsequent positioning sessions.

Clause 6. The method of any of clauses 1 to 5, wherein the second set of values is a subset of values for the set of positioning capability parameters.

Clause 7. The method of clause 6, wherein each value of the subset of values is associated with a flag indicating that the value is to be stored by a network entity for subsequent positioning sessions.

Clause 8. The method of any of clauses 6 to 7, wherein the first set of values is a different set of values for the subset of values for the set of positioning capability parameters.

Clause 9. The method of any of clauses 1 to 8, wherein: the variable positioning capabilities are positioning capabilities that the UE is only capable of providing for a limited time, and the non-variable positioning capabilities are positioning capabilities that the UE is always capable of providing.

Clause 10. The method of any of clauses 1 to 9, wherein: the second set of values are differential values relative to the first set of values, or the first set of values are differential values relative to the second set of values.

Clause 11. The method of any of clauses 1 to 10, wherein the non-variable positioning capabilities of the UE represented by the set of positioning capability parameters are to be stored by an access and mobility management function (AMF).

Clause 12. A method of wireless communication performed by a network entity, comprising: receiving one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 13. The method of clause 12, wherein the network entity is a location server, the method further comprising: transmitting a positioning capability request to the UE, the positioning capability request indicating the set of positioning capability parameters.

Clause 14. The method of clause 13, wherein the positioning capability request includes a flag indicating that values of the set of positioning capability parameters will be stored by a second network entity.

Clause 15. The method of any of clauses 12 to 14, wherein the one or more positioning capability reports includes a flag indicating that the second set of values indicate positioning capabilities of the UE represented by the set of positioning capability parameters to be stored by a second network entity for subsequent positioning sessions.

Clause 16. The method of any of clauses 12 to 15, wherein the second set of values is a subset of values for the set of positioning capability parameters.

Clause 17. The method of clause 16, wherein each value of the subset of values is associated with a flag indicating that the value is to be stored by a second network entity for subsequent positioning sessions.

Clause 18. The method of any of clauses 16 to 17, wherein the first set of values is a different set of values for the subset of values for the set of positioning capability parameters.

Clause 19. The method of any of clauses 12 to 18, wherein: the variable positioning capabilities are positioning capabilities that the UE is only capable of providing for a limited time, and the non-variable positioning capabilities represent positioning capabilities that the UE is always capable of providing.

Clause 20. The method of any of clauses 12 to 19, wherein: the second set of values are differential values relative to the first set of values, or the first set of values are differential values relative to the second set of values.

Clause 21. The method of any of clauses 12 to 20, wherein the non-variable positioning capabilities of the UE represented by the set of positioning capability parameters are to be stored by an access and mobility management function (AMF).

Clause 22. A method of wireless communication performed by a first network entity, comprising: receiving one or more positioning capability reports from a user equipment (UE), the one or more positioning capability reports including a set of values for a set of positioning capability parameters, wherein the set of values are non-variable for subsequent positioning sessions involving the UE; and transmitting the set of values to a second network entity via one or more capability transfer messages to enable the second network entity to store the set of values for subsequent positioning sessions involving the UE.

Clause 23. The method of clause 22, wherein: the first network entity is an access and mobility management function (AMF), and the second network entity is a first location server.

Clause 24. The method of clause 23, further comprising: transmitting the set of values to a second location server via one or more capability transfer messages based on the UE switching from the first location server to a second location server due to mobility of the UE.

Clause 25. The method of clause 22, wherein: the first network entity is a location management function (LMF), and the second network entity is an AMF.

Clause 26. A method of wireless communication performed by a second network entity, comprising: receiving, from a first network entity, via one or more capability transfer messages, a set of values for a set of positioning capability parameters from one or more positioning capability reports of a user equipment (UE), wherein the set of values are non-variable for subsequent positioning sessions involving the UE.

Clause 27. The method of clause 26, wherein: the first network entity is a location management function (LMF), and the second network entity is an access and mobility management function (AMF).

Clause 28. A user equipment (UE), comprising: a memory; at least one transceiver; and at least one processor communicatively coupled to the memory and the at least one transceiver, the at least one processor configured to: transmit, via the at least one transceiver, one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 29. The UE of clause 28, wherein the at least one processor is further configured to: receive, via the at least one transceiver, a positioning capability request from the location server, the positioning capability request indicating the set of positioning capability parameters.

Clause 30. The UE of clause 29, wherein the positioning capability request includes a flag indicating that values of the set of positioning capability parameters will be stored by a network entity.

Clause 31. The UE of clause 30, wherein the one or more positioning capability reports including the first set of values and the second set of values are transmitted in response to the positioning capability request including the flag.

Clause 32. The UE of any of clauses 28 to 31, wherein the one or more positioning capability reports include a flag indicating that the second set of values indicate positioning capabilities of the UE represented by the set of positioning capability parameters to be stored by a network entity for subsequent positioning sessions.

Clause 33. The UE of any of clauses 28 to 32, wherein the second set of values is a subset of values for the set of positioning capability parameters.

Clause 34. The UE of clause 33, wherein each value of the subset of values is associated with a flag indicating that the value is to be stored by a network entity for subsequent positioning sessions.

Clause 35. The UE of any of clauses 33 to 34, wherein the first set of values is a different set of values for the subset of values for the set of positioning capability parameters.

Clause 36. The UE of any of clauses 28 to 35, wherein: the variable positioning capabilities are positioning capabilities that the UE is only capable of providing for a limited time, and the non-variable positioning capabilities are positioning capabilities that the UE is always capable of providing.

Clause 37. The UE of any of clauses 28 to 36, wherein: the second set of values are differential values relative to the first set of values, or the first set of values are differential values relative to the second set of values.

Clause 38. The UE of any of clauses 28 to 37, wherein the non-variable positioning capabilities of the UE represented by the set of positioning capability parameters are to be stored by an access and mobility management function (AMF).

Clause 39. A network entity, comprising: a memory; at least one transceiver; and at least one processor communicatively coupled to the memory and the at least one transceiver, the at least one processor configured to: receive, via the at least one transceiver, one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 40. The network entity of clause 39, wherein: the network entity is a location server, and the at least one processor is further configured to transmit, via the at least one transceiver, a positioning capability request to the UE, the positioning capability request indicating the set of positioning capability parameters.

Clause 41. The network entity of clause 40, wherein the positioning capability request includes a flag indicating that values of the set of positioning capability parameters will be stored by a second network entity.

Clause 42. The network entity of any of clauses 39 to 41, wherein the one or more positioning capability reports includes a flag indicating that the second set of values indicate positioning capabilities of the UE represented by the set of positioning capability parameters to be stored by a second network entity for subsequent positioning sessions.

Clause 43. The network entity of any of clauses 39 to 42, wherein the second set of values is a subset of values for the set of positioning capability parameters.

Clause 44. The network entity of clause 43, wherein each value of the subset of values is associated with a flag indicating that the value is to be stored by a second network entity for subsequent positioning sessions.

Clause 45. The network entity of any of clauses 43 to 44, wherein the first set of values is a different set of values for the subset of values for the set of positioning capability parameters.

Clause 46. The network entity of any of clauses 39 to 45, wherein: the variable positioning capabilities are positioning capabilities that the UE is only capable of providing for a limited time, and the non-variable positioning capabilities represent positioning capabilities that the UE is always capable of providing.

Clause 47. The network entity of any of clauses 39 to 46, wherein: the second set of values are differential values relative to the first set of values, or the first set of values are differential values relative to the second set of values.

Clause 48. The network entity of any of clauses 39 to 47, wherein the non-variable positioning capabilities of the UE represented by the set of positioning capability parameters are to be stored by an access and mobility management function (AMF).

Clause 49. A first network entity, comprising: a memory; at least one transceiver; and at least one processor communicatively coupled to the memory and the at least one transceiver, the at least one processor configured to: receive, via the at least one transceiver, one or more positioning capability reports from a user equipment (UE), the one or more positioning capability reports including a set of values for a set of positioning capability parameters, wherein the set of values are non-variable for subsequent positioning sessions involving the UE; and transmit, via the at least one transceiver, the set of values to a second network entity via one or more capability transfer messages to enable the second network entity to store the set of values for subsequent positioning sessions involving the UE.

Clause 50. The first network entity of clause 49, wherein: the first network entity is an access and mobility management function (AMF), and the second network entity is a first location server.

Clause 51. The first network entity of clause 50, wherein the at least one processor is further configured to: transmit, via the at least one transceiver, the set of values to a second location server via one or more capability transfer messages based on the UE switching from the first location server to a second location server due to mobility of the UE.

Clause 52. The first network entity of clause 49, wherein: the first network entity is a location management function (LMF), and the second network entity is an AMF.

Clause 53. A second network entity, comprising: a memory; at least one transceiver; and at least one processor communicatively coupled to the memory and the at least one transceiver, the at least one processor configured to: receive, via the at least one transceiver, from a first network entity, via one or more capability transfer messages, a set of values for a set of positioning capability parameters from one or more positioning capability reports of a user equipment (UE), wherein the set of values are non-variable for subsequent positioning sessions involving the UE.

Clause 54. The second network entity of clause 53, wherein: the first network entity is a location management function (LMF), and the second network entity is an access and mobility management function (AMF).

Clause 55. A user equipment (UE), comprising: means for transmitting one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 56. The UE of clause 55, further comprising: means for receiving a positioning capability request from the location server, the positioning capability request indicating the set of positioning capability parameters.

Clause 57. The UE of clause 56, wherein the positioning capability request includes a flag indicating that values of the set of positioning capability parameters will be stored by a network entity.

Clause 58. The UE of clause 57, wherein the one or more positioning capability reports including the first set of values and the second set of values are transmitted in response to the positioning capability request including the flag.

Clause 59. The UE of any of clauses 55 to 58, wherein the one or more positioning capability reports include a flag indicating that the second set of values indicate positioning capabilities of the UE represented by the set of positioning capability parameters to be stored by a network entity for subsequent positioning sessions.

Clause 60. The UE of any of clauses 55 to 59, wherein the second set of values is a subset of values for the set of positioning capability parameters.

Clause 61. The UE of clause 60, wherein each value of the subset of values is associated with a flag indicating that the value is to be stored by a network entity for subsequent positioning sessions.

Clause 62. The UE of any of clauses 60 to 61, wherein the first set of values is a different set of values for the subset of values for the set of positioning capability parameters.

Clause 63. The UE of any of clauses 55 to 62, wherein: the variable positioning capabilities are positioning capabilities that the UE is only capable of providing for a limited time, and the non-variable positioning capabilities are positioning capabilities that the UE is always capable of providing.

Clause 64. The UE of any of clauses 55 to 63, wherein: the second set of values are differential values relative to the first set of values, or the first set of values are differential values relative to the second set of values.

Clause 65. The UE of any of clauses 55 to 64, wherein the non-variable positioning capabilities of the UE represented by the set of positioning capability parameters are to be stored by an access and mobility management function (AMF).

Clause 66. A network entity, comprising: means for receiving one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 67. The network entity of clause 66, wherein the network entity is a location server, the network entity further comprising: means for transmitting a positioning capability request to the UE, the positioning capability request indicating the set of positioning capability parameters.

Clause 68. The network entity of clause 67, wherein the positioning capability request includes a flag indicating that values of the set of positioning capability parameters will be stored by a second network entity.

Clause 69. The network entity of any of clauses 66 to 68, wherein the one or more positioning capability reports includes a flag indicating that the second set of values indicate positioning capabilities of the UE represented by the set of positioning capability parameters to be stored by a second network entity for subsequent positioning sessions.

Clause 70. The network entity of any of clauses 66 to 69, wherein the second set of values is a subset of values for the set of positioning capability parameters.

Clause 71. The network entity of clause 70, wherein each value of the subset of values is associated with a flag indicating that the value is to be stored by a second network entity for subsequent positioning sessions.

Clause 72. The network entity of any of clauses 70 to 71, wherein the first set of values is a different set of values for the subset of values for the set of positioning capability parameters.

Clause 73. The network entity of any of clauses 66 to 72, wherein: the variable positioning capabilities are positioning capabilities that the UE is only capable of providing for a limited time, and the non-variable positioning capabilities represent positioning capabilities that the UE is always capable of providing.

Clause 74. The network entity of any of clauses 66 to 73, wherein: the second set of values are differential values relative to the first set of values, or the first set of values are differential values relative to the second set of values.

Clause 75. The network entity of any of clauses 66 to 74, wherein the non-variable positioning capabilities of the UE represented by the set of positioning capability parameters are to be stored by an access and mobility management function (AMF).

Clause 76. A first network entity, comprising: means for receiving one or more positioning capability reports from a user equipment (UE), the one or more positioning capability reports including a set of values for a set of positioning capability parameters, wherein the set of values are non-variable for subsequent positioning sessions involving the UE; and means for transmitting the set of values to a second network entity via one or more capability transfer messages to enable the second network entity to store the set of values for subsequent positioning sessions involving the UE.

Clause 77. The first network entity of clause 76, wherein: the first network entity is an access and mobility management function (AMF), and the second network entity is a first location server.

Clause 78. The first network entity of clause 77, further comprising: means for transmitting the set of values to a second location server via one or more capability transfer messages based on the UE switching from the first location server to a second location server due to mobility of the UE.

Clause 79. The first network entity of clause 76, wherein: the first network entity is a location management function (LMF), and the second network entity is an AMF.

Clause 80. A second network entity, comprising: means for receiving, from a first network entity, via one or more capability transfer messages, a set of values for a set of positioning capability parameters from one or more positioning capability reports of a user equipment (UE), wherein the set of values are non-variable for subsequent positioning sessions involving the UE.

Clause 81. The second network entity of clause 80, wherein: the first network entity is a location management function (LMF), and the second network entity is an access and mobility management function (AMF).

Clause 82. A non-transitory computer-readable medium storing computer-executable instructions that, when executed by a user equipment (UE), cause the UE to: transmit one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 83. The non-transitory computer-readable medium of clause 82, further comprising computer-executable instructions that, when executed by the UE, cause the UE to: receive a positioning capability request from the location server, the positioning capability request indicating the set of positioning capability parameters.

Clause 84. The non-transitory computer-readable medium of clause 83, wherein the positioning capability request includes a flag indicating that values of the set of positioning capability parameters will be stored by a network entity.

Clause 85. The non-transitory computer-readable medium of clause 84, wherein the one or more positioning capability reports including the first set of values and the second set of values are transmitted in response to the positioning capability request including the flag.

Clause 86. The non-transitory computer-readable medium of any of clauses 82 to 85, wherein the one or more positioning capability reports include a flag indicating that the second set of values indicate positioning capabilities of the UE represented by the set of positioning capability parameters to be stored by a network entity for subsequent positioning sessions.

Clause 87. The non-transitory computer-readable medium of any of clauses 82 to 86, wherein the second set of values is a subset of values for the set of positioning capability parameters.

Clause 88. The non-transitory computer-readable medium of clause 87, wherein each value of the subset of values is associated with a flag indicating that the value is to be stored by a network entity for subsequent positioning sessions.

Clause 89. The non-transitory computer-readable medium of any of clauses 87 to 88, wherein the first set of values is a different set of values for the subset of values for the set of positioning capability parameters.

Clause 90. The non-transitory computer-readable medium of any of clauses 82 to 89, wherein: the variable positioning capabilities are positioning capabilities that the UE is only capable of providing for a limited time, and the non-variable positioning capabilities are positioning capabilities that the UE is always capable of providing.

Clause 91. The non-transitory computer-readable medium of any of clauses 82 to 90, wherein: the second set of values are differential values relative to the first set of values, or the first set of values are differential values relative to the second set of values.

Clause 92. The non-transitory computer-readable medium of any of clauses 82 to 91, wherein the non-variable positioning capabilities of the UE represented by the set of positioning capability parameters are to be stored by an access and mobility management function (AMF).

Clause 93. A non-transitory computer-readable medium storing computer-executable instructions that, when executed by a network entity, cause the network entity to: receive one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

Clause 94. The non-transitory computer-readable medium of clause 93, wherein the network entity is a location server, the non-transitory computer-readable medium further comprising: computer-executable instructions that, when executed by the first network entity, cause the first network entity to transmit a positioning capability request to the UE, the positioning capability request indicating the set of positioning capability parameters.

Clause 95. The non-transitory computer-readable medium of clause 94, wherein the positioning capability request includes a flag indicating that values of the set of positioning capability parameters will be stored by a second network entity.

Clause 96. The non-transitory computer-readable medium of any of clauses 93 to 95, wherein the one or more positioning capability reports includes a flag indicating that the second set of values indicate positioning capabilities of the UE represented by the set of positioning capability parameters to be stored by a second network entity for subsequent positioning sessions.

Clause 97. The non-transitory computer-readable medium of any of clauses 93 to 96, wherein the second set of values is a subset of values for the set of positioning capability parameters.

Clause 98. The non-transitory computer-readable medium of clause 97, wherein each value of the subset of values is associated with a flag indicating that the value is to be stored by a second network entity for subsequent positioning sessions.

Clause 99. The non-transitory computer-readable medium of any of clauses 97 to 98, wherein the first set of values is a different set of values for the subset of values for the set of positioning capability parameters.

Clause 100. The non-transitory computer-readable medium of any of clauses 93 to 99, wherein: the variable positioning capabilities are positioning capabilities that the UE is only capable of providing for a limited time, and the non-variable positioning capabilities represent positioning capabilities that the UE is always capable of providing.

Clause 101. The non-transitory computer-readable medium of any of clauses 93 to 100, wherein: the second set of values are differential values relative to the first set of values, or the first set of values are differential values relative to the second set of values.

Clause 102. The non-transitory computer-readable medium of any of clauses 93 to 101, wherein the non-variable positioning capabilities of the UE represented by the set of positioning capability parameters are to be stored by an access and mobility management function (AMF).

Clause 103. A non-transitory computer-readable medium storing computer-executable instructions that, when executed by a first network entity, cause the first network entity to: receive one or more positioning capability reports from a user equipment (UE), the one or more positioning capability reports including a set of values for a set of positioning capability parameters, wherein the set of values are non-variable for subsequent positioning sessions involving the UE; and transmit the set of values to a second network entity via one or more capability transfer messages to enable the second network entity to store the set of values for subsequent positioning sessions involving the UE.

Clause 104. The non-transitory computer-readable medium of clause 103, wherein: the first network entity is an access and mobility management function (AMF), and the second network entity is a first location server.

Clause 105. The non-transitory computer-readable medium of clause 104, further comprising computer-executable instructions that, when executed by the first network entity, cause the first network entity to: transmit the set of values to a second location server via one or more capability transfer messages based on the UE switching from the first location server to a second location server due to mobility of the UE.

Clause 106. The non-transitory computer-readable medium of clause 103, wherein: the first network entity is a location management function (LMF), and the second network entity is an AMF.

Clause 107. A non-transitory computer-readable medium storing computer-executable instructions that, when executed by a second network entity, cause the second network entity to: receive, from a first network entity, via one or more capability transfer messages, a set of values for a set of positioning capability parameters from one or more positioning capability reports of a user equipment (UE), wherein the set of values are non-variable for subsequent positioning sessions involving the UE.

Clause 108. The non-transitory computer-readable medium of clause 107, wherein: the first network entity is a location management function (LMF), and the second network entity is an access and mobility management function (AMF).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
transmitting one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

2. The method of claim 1, further comprising:
receiving a positioning capability request from the location server, the positioning capability request indicating the set of positioning capability parameters.

3. The method of claim 2, wherein the positioning capability request includes a flag indicating that values of the set of positioning capability parameters will be stored by a network entity.

4. The method of claim 3, wherein the one or more positioning capability reports including the first set of values and the second set of values are transmitted in response to the positioning capability request including the flag.

5. The method of claim 1, wherein the one or more positioning capability reports include a flag indicating that the second set of values indicate positioning capabilities of the UE represented by the set of positioning capability parameters to be stored by a network entity for subsequent positioning sessions.

6. The method of claim 1, wherein the second set of values is a subset of values for the set of positioning capability parameters.

7. The method of claim 6, wherein each value of the subset of values is associated with a flag indicating that the value is to be stored by a network entity for subsequent positioning sessions.

8. The method of claim 6, wherein the first set of values is a different set of values for the subset of values for the set of positioning capability parameters.

9. The method of claim 1, wherein:
the variable positioning capabilities are positioning capabilities that the UE is only capable of providing for a limited time, and
the non-variable positioning capabilities are positioning capabilities that the UE is always capable of providing.

10. The method of claim 1, wherein:
the second set of values are differential values relative to the first set of values, or
the first set of values are differential values relative to the second set of values.

11. The method of claim 1, wherein the non-variable positioning capabilities of the UE represented by the set of positioning capability parameters are to be stored by an access and mobility management function (AMF).

12. A method of wireless communication performed by a network entity, comprising:
receiving one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

13. The method of claim 12, wherein the network entity is a location server, the method further comprising:
transmitting a positioning capability request to the UE, the positioning capability request indicating the set of positioning capability parameters.

14. The method of claim 13, wherein the positioning capability request includes a flag indicating that values of the set of positioning capability parameters will be stored by a second network entity.

15. The method of claim 12, wherein the one or more positioning capability reports includes a flag indicating that the second set of values indicate positioning capabilities of the UE represented by the set of positioning capability parameters to be stored by a second network entity for subsequent positioning sessions.

16. The method of claim 12, wherein the second set of values is a subset of values for the set of positioning capability parameters.

17. The method of claim 16, wherein each value of the subset of values is associated with a flag indicating that the value is to be stored by a second network entity for subsequent positioning sessions.

18. The method of claim 16, wherein the first set of values is a different set of values for the subset of values for the set of positioning capability parameters.

19. The method of claim 12, wherein:
the variable positioning capabilities are positioning capabilities that the UE is only capable of providing for a limited time, and
the non-variable positioning capabilities represent positioning capabilities that the UE is always capable of providing.

20. The method of claim 12, wherein:
the second set of values are differential values relative to the first set of values, or
the first set of values are differential values relative to the second set of values.

21. The method of claim 12, wherein the non-variable positioning capabilities of the UE represented by the set of positioning capability parameters are to be stored by an access and mobility management function (AMF).

22. A user equipment (UE), comprising:
a memory;
at least one transceiver; and
at least one processor communicatively coupled to the memory and the at least one transceiver, the at least one processor configured to:
transmit, via the at least one transceiver, one or more positioning capability reports to a location server, the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

23. The UE of claim 22, wherein the at least one processor is further configured to:

receive, via the at least one transceiver, a positioning capability request from the location server, the positioning capability request indicating the set of positioning capability parameters.

24. The UE of claim 22, wherein the one or more positioning capability reports include a flag indicating that the second set of values indicate positioning capabilities of the UE represented by the set of positioning capability parameters to be stored by a network entity for subsequent positioning sessions.

25. The UE of claim 22, wherein the second set of values is a subset of values for the set of positioning capability parameters.

26. The UE of claim 22, wherein:

the second set of values are differential values relative to the first set of values, or the first set of values are differential values relative to the second set of values.

27. A network entity, comprising:

a memory;

at least one transceiver; and at least one processor communicatively coupled to the memory and the at least one transceiver, the at least one processor configured to:

receive, via the at least one transceiver, one or more positioning capability reports from a user equipment (UE), the one or more positioning capability reports including a first set of values for a set of positioning capability parameters and a second set of values for the set of positioning capability parameters, wherein the first set of values indicate variable positioning capabilities of the UE represented by the set of positioning capability parameters, and wherein the second set of values indicate non-variable positioning capabilities of the UE represented by the set of positioning capability parameters.

28. The network entity of claim 27, wherein the network entity is a location server, the method further comprising:

transmit, via the at least one transceiver, a positioning capability request to the UE, the positioning capability request indicating the set of positioning capability parameters.

29. The network entity of claim 27, wherein the one or more positioning capability reports includes a flag indicating that the second set of values indicate positioning capabilities of the UE represented by the set of positioning capability parameters to be stored by a second network entity for subsequent positioning sessions.

30. The network entity of claim 27, wherein the second set of values is a subset of values for the set of positioning capability parameters.

31. The network entity of claim 27, wherein:

the second set of values are differential values relative to the first set of values, or the first set of values are differential values relative to the second set of values.

* * * * *